United States Patent
Klug et al.

(10) Patent No.: US 11,402,629 B2
(45) Date of Patent: Aug. 2, 2022

(54) SEPARATED PUPIL OPTICAL SYSTEMS FOR VIRTUAL AND AUGMENTED REALITY AND METHODS FOR DISPLAYING IMAGES USING SAME

(71) Applicant: MAGIC LEAP, INC., Plantation, FL (US)

(72) Inventors: Michael A. Klug, Austin, TX (US); Scott C. Cahall, Fairport, NY (US); Hyunsun Chung, Weston, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 15/146,296

(22) Filed: May 4, 2016

(65) Prior Publication Data
US 2016/0327789 A1    Nov. 10, 2016

Related U.S. Application Data

(60) Provisional application No. 62/156,809, filed on May 4, 2015.

(51) Int. Cl.
*G02B 6/26* (2006.01)
*G02B 27/01* (2006.01)
(Continued)

(52) U.S. Cl.
CPC ..... *G02B 27/0101* (2013.01); *G02B 27/0988* (2013.01); *G02B 27/4205* (2013.01);
(Continued)

(58) Field of Classification Search
CPC .. G03H 1/2645; G02B 27/2207; G02B 30/24; G02B 27/0101; G02B 27/4205;
(Continued)

(56) References Cited

U.S. PATENT DOCUMENTS 5,742,262 A      4/1998  Tabata et al.
6,215,590 B1 *   4/2001  Okano ............... G02B 27/2264
                                                       348/54
(Continued)

FOREIGN PATENT DOCUMENTS

JP    0384516 A    4/1991
JP    08166559 A   6/1996
(Continued)

OTHER PUBLICATIONS

PCT International Search Report and Written Opinion for International Appln. No. PCT/US2016/030717, Applicant Magic Leap, Inc., forms PCT/ISA/210, 220, and 237, dated Aug. 5, 2016 (17 pages).
(Continued)

*Primary Examiner* — Audrey Y Chang
(74) *Attorney, Agent, or Firm* — Kilpatrick Townsend & Stockton LLP

(57) ABSTRACT

An imaging system includes a light source configured to produce a plurality of spatially separated light beams. The system also includes an injection optical system configured to modify the plurality of beams, such that respective pupils formed by beams of the plurality exiting from the injection optical system are spatially separated from each other. The system further includes a light-guiding optical element having an in-coupling grating configured to admit a first beam of the plurality into the light-guiding optical element while excluding a second beam of the plurality from the light-guiding optical element, such that the first beam propagates by substantially total internal reflection through the light-guiding optical element.

15 Claims, 34 Drawing Sheets

(51) Int. Cl.
 *G02B 27/42* (2006.01)
 *G02B 27/09* (2006.01)
 *H04N 9/31* (2006.01)
 *G02B 30/24* (2020.01)

(52) U.S. Cl.
 CPC ............ *G02B 30/24* (2020.01); *H04N 9/3102* (2013.01); *G02B 2027/0134* (2013.01)

(58) Field of Classification Search
 CPC ............ G02B 27/0988; G02B 27/0081; G02B 27/4272; G02B 27/0172; G02B 2027/0134; G02B 2027/0125; G02B 2027/0112; G02B 2027/0127; H04N 9/3158
 USPC ........ 359/15, 34, 569, 463, 464, 630; 345/7, 345/8, 204; 349/62; 353/7, 20
 See application file for complete search history.

(56) References Cited

U.S. PATENT DOCUMENTS

| | | | |
|---|---|---|---|
| 6,646,716 B1 | 11/2003 | Ramanujan et al. | |
| 6,648,475 B1* | 11/2003 | Roddy ................. | H04N 9/3158 348/E5.141 |
| 7,180,837 B2* | 2/2007 | Yi ........................ | G11B 7/1275 369/112.08 |
| 7,205,960 B2* | 4/2007 | David ................. | G02B 27/0103 345/204 |
| 7,573,640 B2* | 8/2009 | Nivon .................. | G02B 5/1814 345/7 |
| 7,719,767 B2* | 5/2010 | Lin ....................... | G02B 6/0036 349/62 |
| 8,254,031 B2 | 8/2012 | Levola | |
| 8,913,324 B2 | 12/2014 | Schrader | |
| 8,949,099 B1 | 2/2015 | Lai et al. | |
| 8,965,152 B2* | 2/2015 | Simmonds ......... | G02B 27/0101 385/27 |
| 2004/0174348 A1 | 9/2004 | David | |
| 2006/0250580 A1* | 11/2006 | Silverstein ........... | H04N 9/3194 353/20 |
| 2009/0190095 A1* | 7/2009 | Ellinger ............. | G02B 27/2207 353/7 |
| 2010/0079865 A1 | 4/2010 | Saarikko et al. | |
| 2011/0157667 A1 | 6/2011 | Lacoste et al. | |
| 2011/0205514 A1 | 8/2011 | Kita | |
| 2011/0242661 A1 | 10/2011 | Simmonds | |
| 2011/0261174 A1 | 10/2011 | Silverstein | |
| 2013/0088780 A1 | 4/2013 | Jarvenpaa et al. | |
| 2013/0322810 A1 | 12/2013 | Robbins | |
| 2014/0035959 A1 | 2/2014 | Lapstun | |
| 2014/0140653 A1 | 5/2014 | Brown et al. | |
| 2014/0192418 A1 | 7/2014 | Suzuki | |
| 2016/0327789 A1 | 11/2016 | Klug et al. | |
| 2016/0377866 A1* | 12/2016 | Alexander ........... | G03H 1/2645 345/8 |
| 2018/0267309 A1 | 9/2018 | Klug et al. | |
| 2020/0355918 A1* | 11/2020 | Klug ................. | G02B 27/4205 |

FOREIGN PATENT DOCUMENTS

| | | |
|---|---|---|
| JP | 10262165 A | 9/1998 |
| JP | 2007033669 A | 2/2007 |
| JP | 2009186794 A | 8/2009 |
| JP | 2014224846 A | 12/2014 |
| WO | 2013/188464 | 12/2013 |

OTHER PUBLICATIONS

Extended European Search Report for EP Appln. No. 16789991.3, dated Apr. 4, 2018 (10 pages).
Response to Extended European Search Report for Appln. No. EP16789991.3, Applicant Magic Leap, Inc., filed on Oct. 29, 2018.
1st Examination Report for European Appln. No. 16789991.3, dated Jul. 19, 2019 (6 pages).
Office action dated Oct. 22, 2019 for U.S. Appl. No. 15/988,255.
1st Office Action for Chinese Appln. No. 201680025736.1 dated Oct. 8, 2019, w/ English translation (20 pages).
Response to 1st Examination Report for European Appln. No. 16789991.3, filed Nov. 29, 2019 (11 pages).
Non Final Office Action dated Jan. 22, 2020 for U.S. Appl. No. 15/988,255.
Response to Species Election Requirement dated Dec. 19, 209 for U.S. Appl. No. 15/988,255.
AU2016258618, "First Examination Report", dated Jul. 16, 2020, 4 pages.
CN201680025736.1, "Office Action" with English translation, dated Jul. 3, 2020, 6 pages.
EP16789991.3, "Office Action", dated May 15, 2020, 5 pages.
JP2017-557194, "Office Action" with English translation, dated Feb. 19, 2020, 9 pages.
NZ735943, "First Examination Report", dated Jul. 22, 2020, 5 pages.
PCT/US2016/030717, "International Preliminary Report on Patentability", dated Nov. 16, 2017, 12 pages.
AU2016258618, "Notice of Acceptance", dated Apr. 23, 2021, 3 pages.
IN201747040489, "First Examination Report", dated Dec. 16, 2020, 6 pages.
JP2017-557194, "Notice of Allowance", [no English Translation available], dated Dec. 2, 2020, 3 pages.
NZ735943, "Second Examination Report", dated Feb. 18, 2021, 2 pages.
NZ735943, "Third Examination Report", dated Mar. 3, 2021, 1 page.
IL254886, "Office Action", English Translation, dated Mar. 4, 2021, 6 pages.
U.S. Appl. No. 16/882,011, Non-Final Office Action, dated Jan. 31, 2022, 12 pages.
Application No. EP16789991.3, Notice of Decision to Grant, dated Apr. 14, 2022, 2 pages.
IN202148026514, "First Examination Report" and English Translation, dated Mar. 29, 2022, 6 pages.
Application No. JP2020-219772, Office Action, dated Nov. 26, 2021, 5 pages.
U.S. Appl. No. 16/882,011, Final Office Action, dated May 6, 2022, 7 pages.

* cited by examiner

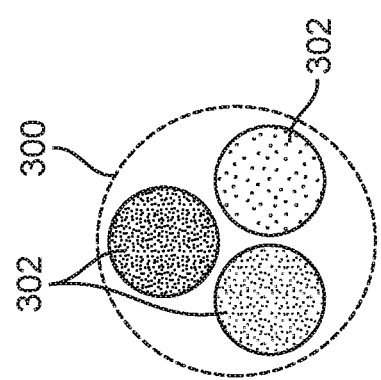
FIG. 20A
FIG. 20B
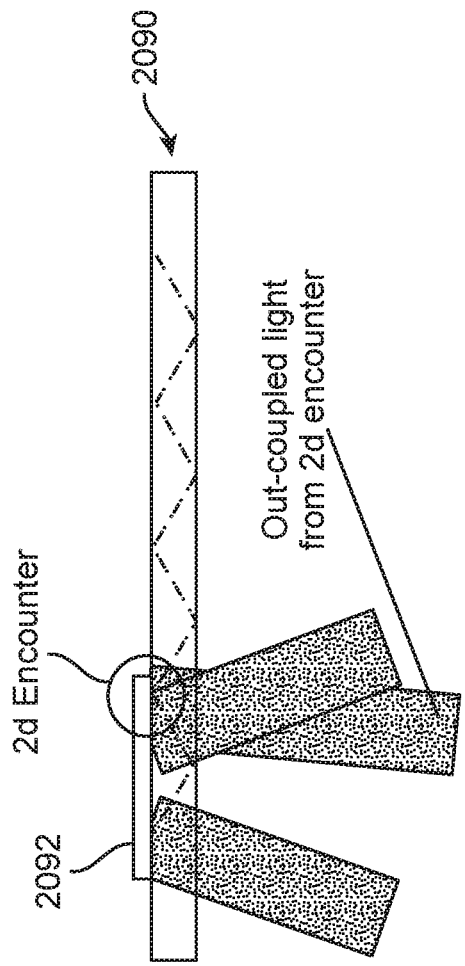
FIG. 20C
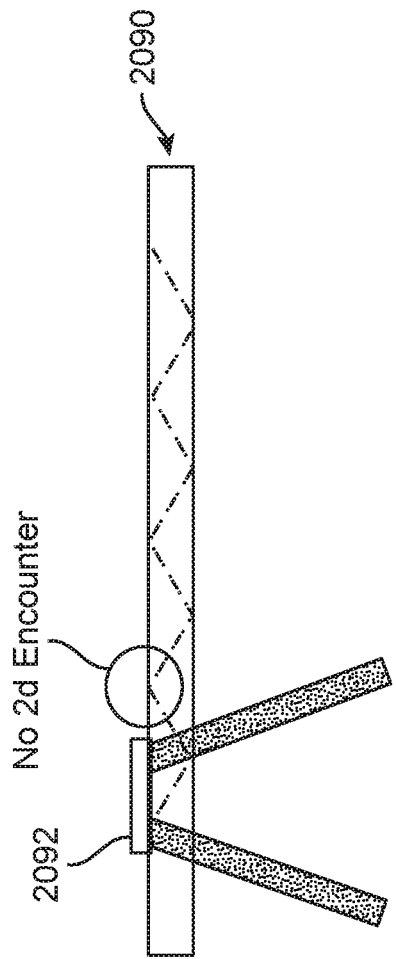
FIG. 20D

SEPARATED PUPIL OPTICAL SYSTEMS FOR VIRTUAL AND AUGMENTED REALITY AND METHODS FOR DISPLAYING IMAGES USING SAME

CROSS-REFERENCE TO RELATED APPLICATION(S)

This application claims priority to U.S. Provisional Application Ser. No. 62/156,809 filed on May 4, 2015 entitled "SEPARATED PUPIL OPTICAL SYSTEMS FOR VIRTUAL AND AUGMENTED REALITY AND METHODS FOR DISPLAYING IMAGES USING SAME." The contents of the aforementioned patent application are hereby expressly and fully incorporated by reference in their entirety, as though set forth in full.

This application is related to U.S. Prov. Patent Application Ser. No. 61/909,774 filed on Nov. 27, 2013 and entitled "VIRTUAL AND AUGMENTED REALITY SYSTEMS AND METHODS," U.S. Utility patent application Ser. No. 14/555,585 filed on Nov. 27, 2014 and entitled "VIRTUAL AND AUGMENTED REALITY SYSTEMS AND METHODS," U.S. Prov. Patent Application Ser. No. 62/005,807 filed on May 30, 2014 and entitled "METHODS AND SYSTEMS FOR VIRTUAL AND AUGMENTED REALITY," U.S. Utility patent application Ser. No. 14/726,424 filed on May 29, 2015 and entitled "METHODS AND SYSTEMS FOR GENERATING VIRTUAL CONTENT DISPLAY WITH A VIRTUAL OR AUGMENTED REALITY APPARATUS," U.S. Prov. Patent Application Ser. No. 62/005,834 filed on May 30, 2014 and entitled "METHODS AND SYSTEM FOR CREATING FOCAL PLANES IN VIRTUAL AND AUGMENTED REALITY," U.S. Utility patent application Ser. No. 14/726,429 filed on May 29, 2015 and entitled "METHODS AND SYSTEM FOR CREATING FOCAL PLANES IN VIRTUAL AND AUGMENTED REALITY," U.S. Prov. Patent Application Ser. No. 62/005,865 filed on May 30, 2014 and entitled "METHODS AND SYSTEMS FOR DISPLAYING STEREOSCOPY WITH A FREEFORM OPTICAL SYSTEM WITH ADDRESSABLE FOCUS FOR VIRTUAL AND AUGMENTED REALITY," and U.S. Utility patent application Ser. No. 14/726,396 filed on May 29, 2015 and entitled "METHODS AND SYSTEMS FOR DISPLAYING STEREOSCOPY WITH A FREEFORM OPTICAL SYSTEM WITH ADDRESSABLE FOCUS FOR VIRTUAL AND AUGMENTED REALITY." The contents of the aforementioned patent applications are hereby expressly and fully incorporated by reference in their entirety, as though set forth in full.

BACKGROUND

Modern computing and display technologies have facilitated the development of systems for so called "virtual reality" or "augmented reality" (collectively referred to as "mixed reality") experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user. Accordingly, AR scenarios involve presentation of digital or virtual image information with at least partial transparency to other actual real-world visual input. The human visual perception system is very complex, and producing an AR or VR technology that facilitates a comfortable, natural-feeling, rich presentation of virtual image elements amongst other virtual or real-world imagery elements is challenging.

The visualization center of the brain gains valuable perception information from the motion of both eyes and components thereof relative to each other. Vergence movements (i.e., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to focus upon an object at a different distance will automatically cause a matching change in vergence to the same distance, under a relationship known as the "accommodation-vergence reflex." Likewise, a change in vergence will trigger a matching change in accommodation, under normal conditions. Working against this reflex, as do most conventional stereoscopic AR or VR configurations, is known to produce eye fatigue, headaches, or other forms of discomfort in users.

Stereoscopic wearable glasses generally feature two displays for the left and right eyes that are configured to display images with slightly different element presentation such that a three-dimensional perspective is perceived by the human visual system. Such configurations have been found to be uncomfortable for many users due to a mismatch between vergence and accommodation ("vergence-accommodation conflict") which must be overcome to perceive the images in three dimensions. Indeed, some users are not able to tolerate stereoscopic configurations. These limitations apply to both AR and VR systems. Accordingly, most conventional AR and VR systems are not optimally suited for presenting a rich, binocular, three-dimensional experience in a manner that will be comfortable and maximally useful to the user, in part because prior systems fail to address some of the fundamental aspects of the human perception system, including the vergence-accommodation conflict.

AR and/or VR systems must also be capable of displaying virtual digital content at various perceived positions and distances relative to the user. The design of AR and/or VR systems also presents numerous other challenges, including the speed of the system in delivering virtual digital content, quality of virtual digital content, eye relief of the user (addressing the vergence-accommodation conflict), size and portability of the system, and other system and optical challenges.

One possible approach to address these problems (including the vergence-accommodation conflict) is to project images at multiple depth planes. To implement this type of system, one approach is to use a large number of optical elements (e.g., light sources, prisms, gratings, filters, scan-optics, beam-splitters, mirrors, half-mirrors, shutters, eye pieces, etc.) to project images at a sufficiently large number (e.g., six) of depth planes. The problem with this approach is that using a large number of components in this manner necessarily requires a larger form factor than is desirable, and limits the degree to which the system size can be reduced. The large number of optical elements in these systems also results in a longer optical path, over which the light and the information contained therein can be degraded. These design issues result in cumbersome systems which are also power intensive. The systems and methods described herein are configured to address these challenges.

SUMMARY

In one embodiment directed to an imaging system, the system includes a light source configured to produce a plurality of spatially separated light beams. The system also includes an injection optical system configured to modify the plurality of beams, such that respective pupils formed by beams of the plurality exiting from the injection optical system are spatially separated from each other. The system further includes a light-guiding optical element having an in-coupling grating configured to admit a first beam of the plurality into the light-guiding optical element while excluding a second beam of the plurality from the light-guiding optical element, such that the first beam propagates by substantially total internal reflection through the light-guiding optical element.

In one or more embodiments, each beam of the plurality differs from other beams of the plurality in at least one light property. The at least one light property may include color and/or polarization.

In one or more embodiments, the light source includes a plurality of sub-light sources. The plurality of sub-light sources may be spatially separated from each other. The plurality of sub-light sources may include first and second groups of sub-light sources, and where sub-light sources of the first group are displaced from sub-light sources of the second group along an optical path of the imaging system.

In one or more embodiments, the light source is a unitary light source configured to produce the plurality of spatially separated light beams. The system may also include a mask overlay configured to segment light from the light source into separate emission areas and positions.

In one or more embodiments, the system also includes a first spatial light modulator configured to encode a first beam of the plurality with image data. The system may also include a second spatial light modulator configured to encode a second beam of the plurality with image data. The first and second spatial light modulators may be configured to be alternatively activated. The first and second spatial light modulators may have respective image fields that are spatially displaced from each other. The first and second spatial light modulators may be configured to generate images at different depth planes.

In one or more embodiments, the system also includes a plurality of light-guiding optical elements having a respective plurality of in-coupling gratings, the light source includes a plurality of sub-light sources, and the respective pluralities of sub-light sources and in-coupling gratings are rotated around an optical axis relative to the first spatial light modulator.

In one or more embodiments, the system also includes a mask configured to modify a shape of a pupil formed by a beam of the plurality adjacent to the light-guiding optical element. The system may also include an optical element configured to modify a size of a pupil formed by a beam of the plurality adjacent to the light-guiding optical element. The injection optical system may have an eccentric cross-section along an optical path of the imaging system. The in-coupling grating may be configured such that the first beam of the plurality encounters the in-coupling grating only once.

In one or more embodiments, the system also includes a pupil expander configured to increase a numerical aperture of the light source. The pupil expander may include a film having a prism pattern disposed thereon. The light source and the injection optical system may be configured such that the respective pupils formed by the plurality of beams exiting from the injection optical system have a plurality of sizes.

In another embodiment directed to a method of displaying an image using an optical system, the method includes a light source producing a first light beam. The method also includes a spatial light modulator encoding the first beam with first image data. The method further includes an injection optical system modifying the first beam such that the first beam addresses a first in-coupling grating on a first light-guiding optical element, thereby entering the first light-guiding optical element, but does not enter a second light-guiding optical element. Moreover, the method includes the light source producing a second light beam. In addition, the method includes the spatial light modulator encoding the second beam with second image data. The method also includes the injection optical system focusing the second beam such that the second beam addresses a second in-coupling grating on the second light-guiding optical element, thereby entering the second light-guiding optical element, but not entering the first light-guiding optical element.

In one or more embodiments, first and second pupils formed by the first and second beams exiting from the injection optical system are spatially separated from each other. The first and second pupils formed by the first and second beams exiting from the injection optical system may also have different sizes.

In one or more embodiments, the method also includes the light source producing a third light beam. The method further includes the spatial light modulator encoding the third beam with third image data. Moreover, the method includes the injection optical system focusing the third beam such that the third beam addresses a third in-coupling grating on a third light-guiding optical element, thereby entering the third light-guiding optical element, but not entering the first or second light-guiding optical elements. The third beam exiting from the injection optical system may form a third pupil. The first, second and third pupils may be spatially separated from each other. The first, second and third pupils may form vertices of a triangle in a plane orthogonal to an optical path of the injection optical system. The first beam may include blue light and the first pupil is smaller than the second and third pupils. The first beam may include green light and the first pupil is larger than the second and third pupils.

In one or more embodiments, the method includes modifying the first and second beams to narrow respective shapes of the first and second pupils.

In one or more embodiments, the light source includes first and second spatially separated sub-light sources configured to produce the first and second beams. The method may include changing image color and/or image depth by deactivating the second sub-light source while maintaining first sub-light source in an activated state.

In one or more embodiments, the first beam includes both red and blue light, and the second beam includes green light.

BRIEF DESCRIPTION OF THE DRAWINGS

The drawings illustrate the design and utility of various embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIGS. 20A and 20B depict sub-pupil and super-pupil shapes and configurations generated by augmented reality systems according to various embodiments;

FIGS. 20C and 20D depict light-guiding optical elements of augmented reality systems according to two embodiments, where the light-guiding optical elements are configured for use with beams corresponding to the sub-pupils and super-pupils depicted in FIGS. 20A and 20B, respectively;

DETAILED DESCRIPTION

Figure 1:
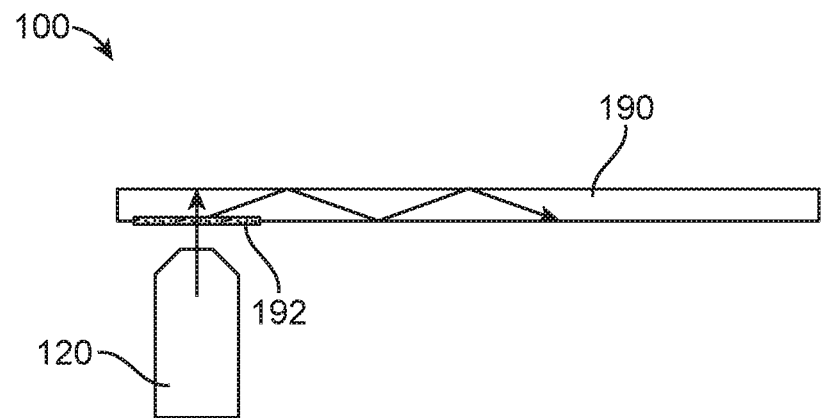
FIGS. 1 to 3 are detailed schematic views of various augmented reality systems.

Various embodiments of the invention are directed to systems, methods, and articles of manufacture for implementing optical systems in a single embodiment or in multiple embodiments. Other objects, features, and advantages of the invention are described in the detailed description, figures, and claims.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

The optical systems may be implemented independently of AR systems, but many embodiments below are described in relation to AR systems for illustrative purposes only.

Summary of Problem and Solution

One type of optical system for generating virtual images at various depths includes numerous optical components (e.g., light sources, prisms, gratings, filters, scan-optics, beam-splitters, mirrors, half-mirrors, shutters, eye pieces, etc.) that increase in number, thereby increasing the complexity, size and cost of AR and VR systems, as the quality of the 3-D experience/scenario (e.g., the number of imaging planes) and the quality of images (e.g., the number of image colors) increases. The increasing size of optical systems with increasing 3-D scenario/image quality imposes a limit on the minimum size of AR and VR systems resulting in cumbersome systems with reduced efficiency.

The following disclosure describes various embodiments of systems and methods for creating 3-D perception using multiple-plane focus optical elements that address the problem, by providing optical systems with fewer components and increased efficiency. In particular, the systems described herein utilize light sources with spatially separated sub-light sources and injection optical systems to generate spatially separated light beams corresponding to respective sub-light sources. After these spatially separated light beams exit the injection optical systems, they focus down to spatially separated sub-pupils (corresponding to respective sub-light sources) adjacent light guiding optical elements ("LOEs"; e.g., a planar waveguide). The sub-pupils can be spatially separated from each other in the X, Y and Z directions. The spatial separation of the sub-pupils allows spatial separation of in-coupling gratings for distinct LOEs, such that each sub-pupil addresses the in-coupling grating of a distinct LOE. Accordingly, LOEs can be selectively illuminated by activating and deactivating sub-light sources. This optical system design takes advantage of separated sub-pupils to reduce the number of optical elements between the light source and the LOEs, thereby simplifying and reducing the size of AR and VR systems.

Illustrative Optical Systems

Before describing the details of embodiments of the separated pupil invention, this disclosure will now provide a brief description of illustrative optical systems. While the embodiments can be used with any optical system, specific systems (e.g., AR systems) are described to illustrate the technologies underlying the embodiments.

One possible approach to implementing an AR system uses a plurality of volume phase holograms, surface-relief holograms, or light-guiding optical elements that are embedded with depth plane information to generate images that appear to originate from respective depth planes. In other words, a diffraction pattern, or diffractive optical element ("DOE") may be embedded within or imprinted upon an LOE such that as collimated light (light beams with substantially planar wavefronts) is substantially totally internally reflected along the LOE, it intersects the diffraction pattern at multiple locations and at least partially exits toward the user's eye. The DOEs are configured so that light exiting therethrough from an LOE are verged so that they appear to originate from a particular depth plane. The collimated light may be generated using an optical condensing lens (a "condenser").

For example, a first LOE may be configured to deliver collimated light to the eye that appears to originate from the optical infinity depth plane (0 diopters). Another LOE may be configured to deliver collimated light that appears to originate from a distance of 2 meters (½ diopter). Yet another LOE may be configured to deliver collimated light that appears to originate from a distance of 1 meter (1 diopter). By using a stacked LOE assembly, it can be appreciated that multiple depth planes may be created, with each LOE configured to display images that appear to originate from a particular depth plane. It should be appreciated that the stack may include any number of LOEs. However, at least N stacked LOEs are required to generate N depth planes. Further, N, 2N or 3N stacked LOEs may be used to generate RGB colored images at N depth planes.

In order to present 3-D virtual content to the user, the AR system projects images of the virtual content into the user's eye so that they appear to originate from various depth planes in the Z direction (i.e., orthogonally away from the user's eye). In other words, the virtual content may not only change in the X and Y directions (i.e., in a 2D plane orthogonal to a central visual axis of the user's eye), but it may also appear to change in the Z direction such that the user may perceive an object to be very close or at an infinite distance or any distance in between. In other embodiments, the user may perceive multiple objects simultaneously at different depth planes. For example, the user may see a virtual dragon appear from infinity and run towards the user. Alternatively, the user may simultaneously see a virtual bird at a distance of 3 meters away from the user and a virtual coffee cup at arm's length (about 1 meter) from the user.

Figure 4:
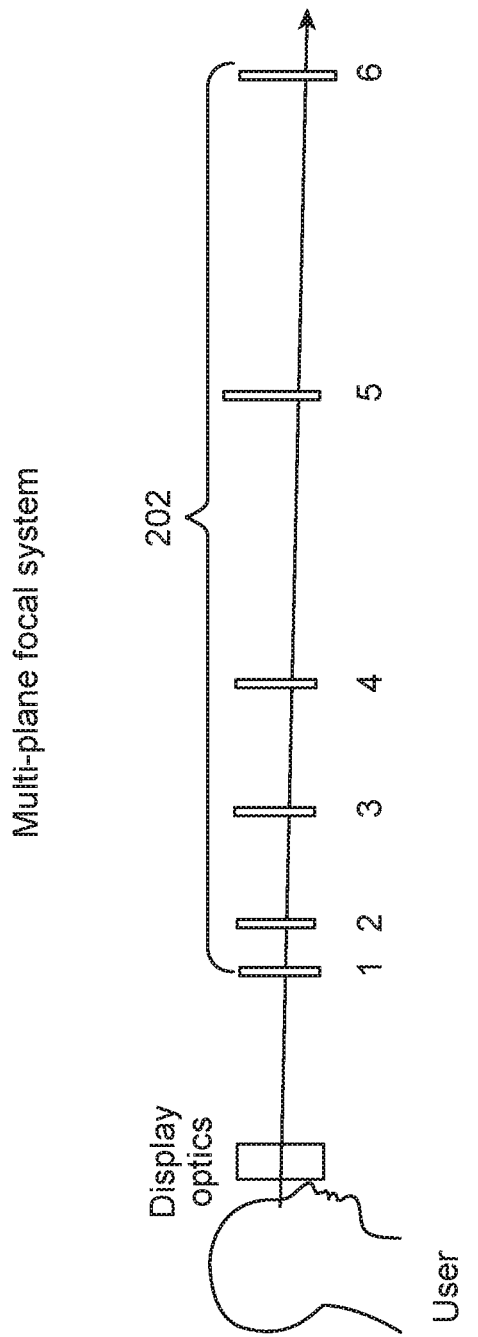
FIG. 4 is a diagram depicting the focal planes of an augmented reality system according to still another embodiment.

Multiple-plane focus systems create a perception of variable depth by projecting images on some or all of a plurality of depth planes located at respective fixed distances in the Z direction from the user's eye. Referring now to FIG. 4, it should be appreciated that multiple-plane focus systems typically display frames at fixed depth planes 202 (e.g., the six depth planes 202 shown in FIG. 4). Although AR systems can include any number of depth planes 202, one exemplary multiple-plane focus system has six fixed depth planes 202 in the Z direction. In generating virtual content at one or more of the six depth planes 202, 3-D perception is created such that the user perceives one or more virtual objects at varying distances from the user's eye. Given that the human eye is more sensitive to objects that are closer in distance than objects that appear to be far away, more depth planes 202 are generated closer to the eye, as shown in FIG. 4. In other embodiments, the depth planes 202 may be placed at equal distances away from each other.

Depth plane positions 202 are typically measured in diopters, which is a unit of optical power equal to the inverse of the focal length measured in meters. For example, in one embodiment, depth plane 1 may be ⅓ diopters away, depth plane 2 may be 0.3 diopters away, depth plane 3 may be 0.2 diopters away, depth plane 4 may be 0.15 diopters away, depth plane 5 may be 0.1 diopters away, and depth plane 6 may represent infinity (i.e., 0 diopters away). It should be appreciated that other embodiments may generate depth planes 202 at other distances/diopters. Thus, in generating virtual content at strategically placed depth planes 202, the user is able to perceive virtual objects in three dimensions. For example, the user may perceive a first virtual object as being close to him when displayed in depth plane 1, while another virtual object appears at infinity at depth plane 6. Alternatively, the virtual object may first be displayed at depth plane 6, then depth plane 5, and so on until the virtual object appears very close to the user. It should be appreciated that the above examples are significantly simplified for illustrative purposes. In another embodiment, all six depth planes may be concentrated on a particular focal distance away from the user. For example, if the virtual content to be displayed is a coffee cup half a meter away from the user, all six depth planes could be generated at various cross-sections of the coffee cup, giving the user a highly granulated 3-D view of the coffee cup.

In one embodiment, the AR system may work as a multiple-plane focus system. In other words, all six LOEs may be illuminated simultaneously, such that images appearing to originate from six fixed depth planes are generated in rapid succession with the light sources rapidly conveying image information to LOE 1, then LOE 2, then LOE 3 and so on. For example, a portion of the desired image, comprising an image of the sky at optical infinity may be injected at time 1 and the LOE 1090 retaining collimation of light (e.g., depth plane 6 from FIG. 4) may be utilized. Then an image of a closer tree branch may be injected at time 2 and an LOE 1090 configured to create an image appearing to originate from a depth plane 10 meters away (e.g., depth plane 5 from FIG. 4) may be utilized; then an image of a pen may be injected at time 3 and an LOE 1090 configured to create an image appearing to originate from a depth plane 1 meter away may be utilized. This type of paradigm can be repeated in rapid time sequential (e.g., at 360 Hz) fashion such that the user's eye and brain (e.g., visual cortex) perceives the input to be all part of the same image.

AR systems are required to project images (i.e., by diverging or converging light beams) that appear to originate from various locations along the Z axis (i.e., depth planes) to generate images for a 3-D experience. As used in this application, light beams include, but are not limited to, directional projections of light energy (including visible and invisible light energy) radiating from a light source. Generating images that appear to originate from various depth planes conforms or synchronizes the vergence and accommodation of the user's eye for that image, and minimizes or eliminates vergence-accommodation conflict.

FIG. 1 depicts a basic optical system 100 for projecting images at a single depth plane. The system 100 includes a light source 120 and an LOE 190 having a diffractive optical element (not shown) and an in-coupling grating 192 ("ICG") associated therewith. The diffractive optical elements may be of any type, including volumetric or surface relief. In one embodiment, the ICG 192 can be a reflection-mode aluminized portion of the LOE 190. In another embodiment, the ICG 192 can be a transmissive diffractive portion of the LOE 190. When the system 100 is in use, a "virtual" light beam from the light source 120 enters the LOE 190 via the ICG 192 and propagates along the LOE 190 by substantially total internal reflection ("TIR") for display to an eye of a user. The light beam is "virtual" because it encodes an image of a non-existent "virtual" object or a portion thereof as directed by the system 100. It is understood that although only one beam is illustrated in FIG. 1, a multitude of beams, which encode an image, may enter the LOE 190 from a wide range of angles through the same ICG 192. A light beam "entering" or being "admitted" into an LOE includes, but is not limited to, the light beam interacting with the LOE so as to propagate along the LOE by substantially TIR. The system 100 depicted in FIG. 1 can include various light sources 120 (e.g., LEDs, OLEDs, lasers, and masked broad-area/broad-band emitters). In other embodiments, light from the light source 120 may also be delivered to the LOE 190 via fiber optic cables (not shown).

Figure 2:
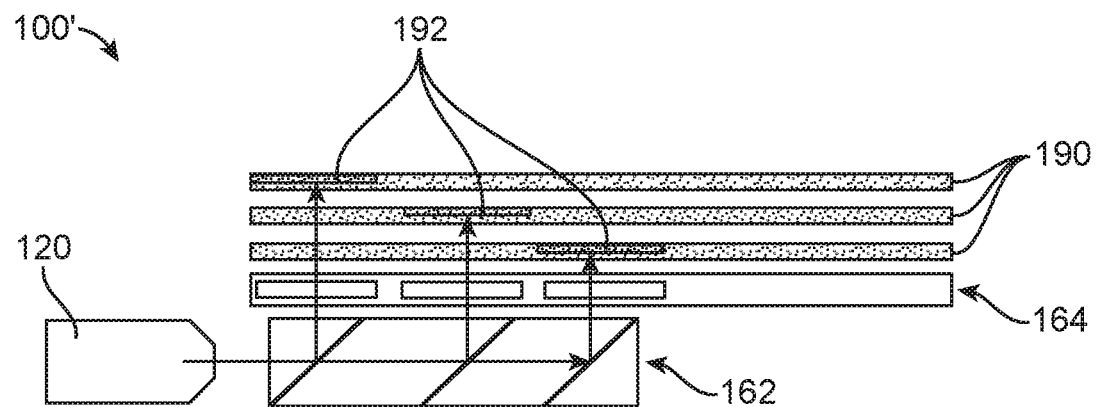

FIG. 2 depicts another optical system 100', which includes a light source 120, and respective pluralities (e.g., three) of LOEs 190, and in-coupling gratings 192. The optical system 100' also includes three beam-splitters or dichroic mirrors 162 (to direct light to the respective LOEs) and three shutters 164 (to control when the LOEs are illuminated by the light source 120). The shutters 164 can be any suitable optical shutter, including, but not limited to, liquid crystal shutters.

When the system 100' is in use, the virtual light beam from the light source 120 is split into three virtual light sub-beams/beam lets by the three-beam-splitters 162. The three beam-splitters 162 also redirect the sub-beams toward respective in-coupling gratings 192. After the sub-beams enter the LOEs 190 through the respective in-coupling gratings 192, they propagate along the LOEs 190 by substantially TIR where they interact with additional optical structures resulting in display (e.g., of a virtual object encoded by sub-beam) to an eye of a user. The surface of in-coupling gratings 192 on the far side of the optical path can be coated with an opaque material (e.g., aluminum) to prevent light from passing through the in-coupling gratings 192 to the next LOE 190. In one embodiment the beam-splitters 162 can be combined with wavelength filters to generate red, green and blue sub-beams. In such an embodiment, three LOEs 190 are required to display a color image at a single depth plane. In another embodiment, LOEs 190 may each present a portion of a larger, single depth-plane image area angularly displaced laterally within the user's field of view, either of like colors, or different colors (forming a "tiled field of view"). While all three virtual light beamlets are depicted as passing through respective shutters 164, typically only one beamlet is selectively allowed to pass through a corresponding shutter 164 at any one time. In this way, the system 100' can coordinate image information encoded by the beam and beamlets with the LOE 190 through which the beamlet and the image information encoded therein will be delivered to the user's eye.

Figure 3:
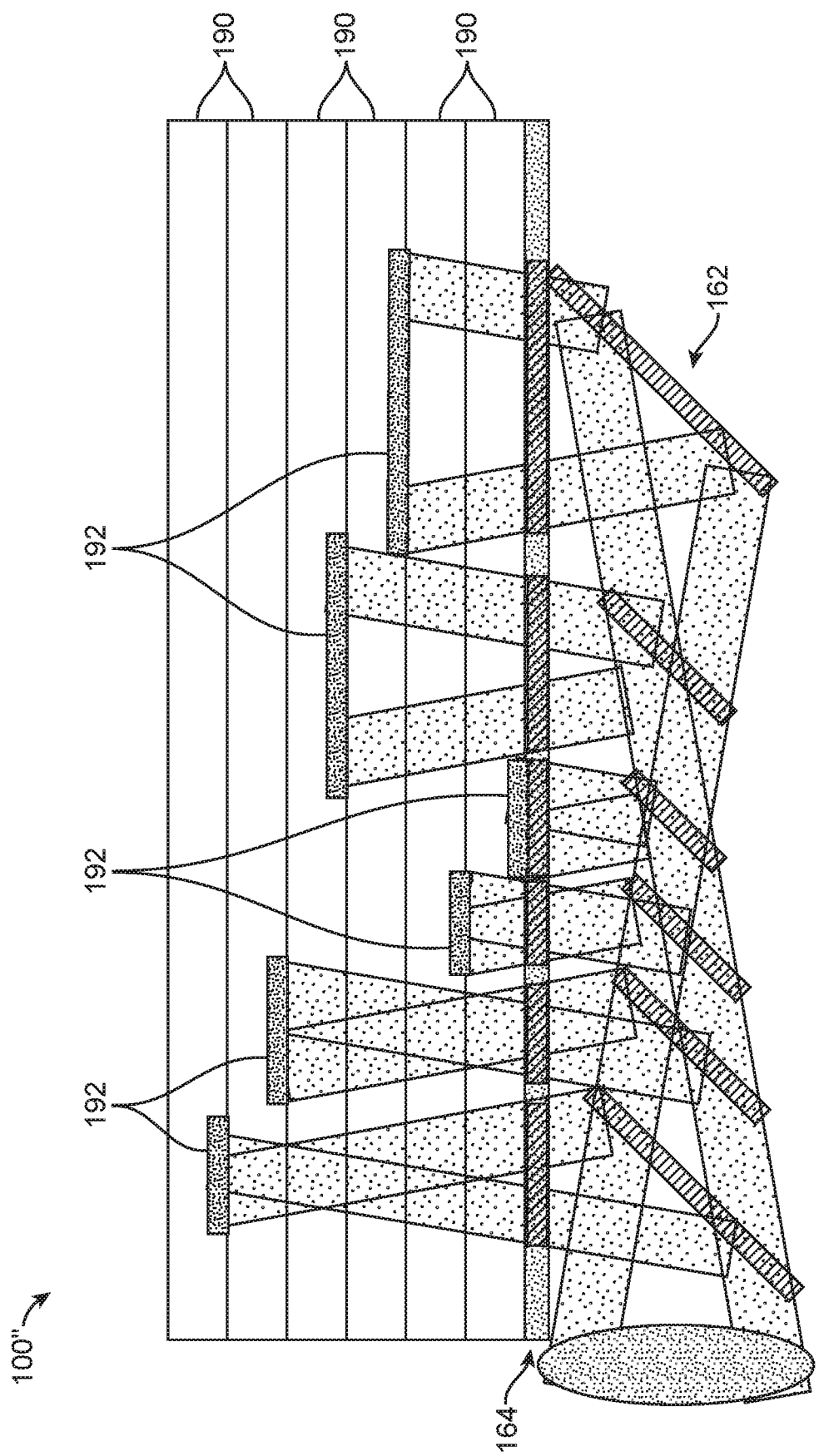

FIG. 3 depicts still another optical system 100", having respective pluralities (e.g., six) of beam-splitters 162, shutters 164, ICGs 192, and LOEs 190. As explained above during the discussion of FIG. 2, three single-color LOEs 190 are required to display a color image at a single depth plane. Therefore, the six LOEs 190 of this system 100" are able to display color images at two depth planes.

The beam splitters 162 in optical system 100" have different sizes. The shutters 164 in optical system 100" have different sizes corresponding to the size of the respective beam splitters 162. The ICGs 192 in optical system 100" have different sizes corresponding to the size of the respective beam splitters 162 and the length of the beam path between the beam splitters 162 and their respective ICGs 192. In some cases, the longer the distance beam path between the beam splitters 162 and their respective ICGs 192, the more the beams diverge and require a larger ICGs 192 to in-couple the light.

As shown in FIGS. 1-3, as the number of depth planes, field tiles, and/or colors generated increases (e.g., with increased AR scenario quality), the numbers of LOEs 190 and other optical system components increases. For example, a single RGB color depth plane requires at least three single-color LOEs 190. As a result, the complexity and size of the optical system also increases. The requirement for clean streams (i.e., no light beam cross contamination or "cross-talk") causes the complexity and size of the optical system to increase in a greater than linear fashion with increasing numbers of LOEs. In addition to the beam-splitters 162 and LC shutters 164, more complicated optical systems can include other light sources, prisms, gratings, filters, scan-optics, mirrors, half-mirrors, eye pieces, etc. As the number of optical elements increases, so does the required working distance of the optics. The light intensity and other optical characteristics degrade as the working distance increases. Further, the geometric constraint of the field of view by the working distance imposes a practical limit on the number of optical elements in an optical system 100.

Separated Pupil Augmented Reality Systems

Figure 5:
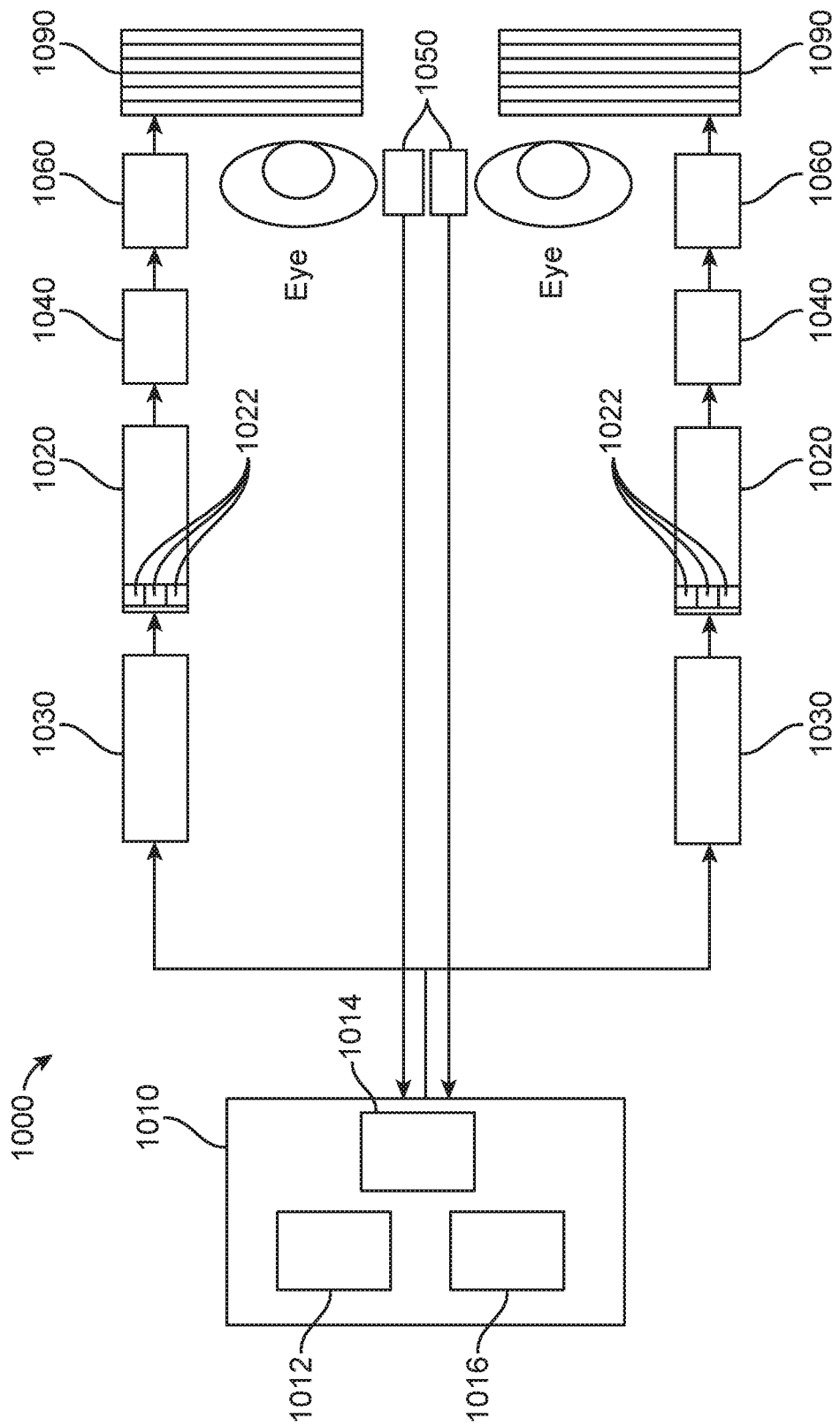
FIG. 5 is a block diagram depicting an augmented reality system according to one embodiment.

Referring now to FIG. 5, an exemplary embodiment of a separated pupil AR system 1000 that addresses the issues of optical system complexity and size will now be described. The system 1000 uses stacked light-guiding optical element assemblies 1090 as described above. The AR system 1000 generally includes an image generating processor 1010, a light source 1020, a controller 1030, a spatial light modulator ("SLM") 1040, an injection optical system 1060, and at least one set of stacked LOEs 1090 that functions as a multiple plane focus system. The system may also include an eye-tracking subsystem 1050. It should be appreciated that other embodiments may have multiple sets of stacked LOEs 1090, but the following disclosure will focus on the exemplary embodiment of FIG. 5.

The image generating processor 1010 is configured to generate virtual content to be displayed to the user. The image generating processor may convert an image or video associated with the virtual content to a format that can be projected to the user in 3-D. For example, in generating 3-D content, the virtual content may need to be formatted such that portions of a particular image are displayed at a particular depth plane while others are displayed at other depth planes. In one embodiment, all of the image may be generated at a particular depth plane. In another embodiment, the image generating processor may be programmed to provide slightly different images to the right and left eyes such that when viewed together, the virtual content appears coherent and comfortable to the user's eyes.

The image generating processor 1010 may further include a memory 1012, a GPU 1014, a CPU 1016, and other circuitry for image generation and processing. The image generating processor 1010 may be programmed with the desired virtual content to be presented to the user of the AR system 1000. It should be appreciated that in some embodiments, the image generating processor 1010 may be housed in the wearable AR system 1000. In other embodiments, the image generating processor 1010 and other circuitry may be housed in a belt pack that is coupled to the wearable optics. The image generating processor 1010 is operatively coupled to the light source 1020 which projects the light associated with the desired virtual content and one or more spatial light modulators (described below).

The light source 1020 is compact and has high resolution. The light source 1020 includes a plurality of spatially separated sub-light sources 1022 that are operatively coupled to a controller 1030 (described below). For instance, the light source 1020 may include color specific LEDs and lasers disposed in various geometric configurations. Alternatively, the light source 1020 may include LEDs or lasers of like color, each one linked to a specific region of the field of view of the display. In another embodiment, the light source 1020 may comprise a broad-area emitter such as an incandescent or fluorescent lamp with a mask overlay for segmentation of emission areas and positions. Although the sub-light sources 1022 are directly connected to the AR system 1000 in FIG. 5, the sub-light sources 1022 may be connected to system 1000 via optical fibers (not shown), as long as the distal ends of the optical fibers (away from the sub-light sources 1022) are spatially separated from each other. The system 1000 may also include condenser (not shown) configured to collimate the light from the light source 1020.

The SLM 1040 may be reflective (e.g., a DLP DMD, a MEMS mirror system, an LCOS, or an FLCOS), transmissive (e.g., an LCD) or emissive (e.g. an FSD or an OLED) in various exemplary embodiments. The type of spatial light modulator (e.g., speed, size, etc.) can be selected to improve the creation of the 3-D perception. While DLP DMDs operating at higher refresh rates may be easily incorporated into stationary AR systems 1000, wearable AR systems 1000 typically use DLPs of smaller size and power. The power of the DLP changes how 3-D depth planes/focal planes are created. The image generating processor 1010 is operatively coupled to the SLM 1040, which encodes the light from the light source 1020 with the desired virtual content. Light from the light source 1020 may be encoded with the image information when it reflects off of, emits from, or passes through the SLM 1040.

Referring back to FIG. 5, the AR system 1000 also includes an injection optical system 1060 configured to direct the light from the light source 1020 (i.e., the plurality of spatially separated sub-light sources 1022) and the SLM 1040 to the LOE assembly 1090. The injection optical system 1060 may include one or more lenses that are configured to direct the light into the LOE assembly 1090. The injection optical system 1060 is configured to form spatially separated and distinct pupils (at respective focal points of the beams exiting from the injection optical system 1060) adjacent the LOEs 1090 corresponding to spatially separated and distinct beams from the sub-light sources 1022 of the light source 1020. The injection optical system 1060 is configured such that the pupils are spatially displaced from each other. In some embodiments, the injection optical system 1060 is configured to spatially displace the beams in the X and Y directions only. In such embodiments, the pupils are formed in one X, Y plane. In other embodiments, the injection optical system 1060 is configured to spatially displace the beams in the X, Y and Z directions.

Spatial separation of light beams forms distinct beams and pupils, which allows placement of in-coupling gratings in distinct beam paths, so that each in-coupling grating is mostly addressed (e.g., intersected or impinged) by only one distinct beam (or group of beams). This, in turn, facilitates entry of the spatially separated light beams into respective LOEs 1090 of the LOE assembly 1090, while minimizing entry of other light beams from other sub-light sources 1022 of the plurality (i.e., cross-talk). A light beam from a particular sub-light source 1022 enters a respective LOE 1090 through an in-coupling grating (not shown in FIG. 5, see FIGS. 1-3) thereon. The in-coupling gratings of respective LOEs 1090 are configured to interact with the spatially separated light beams from the plurality of sub-light sources 1022 such that each spatially separated light beam only intersects with the in-coupling grating of one LOE 1090. Therefore, each spatially separated light beam mainly enters one LOE 1090. Accordingly, image data encoded on light beams from each of the sub-light sources 1022 by the SLM 1040 can be effectively propagated along a single LOE 1090 for delivery to an eye of a user.

Each LOE 1090 is then configured to project an image or sub-image that appears to originate from a desired depth plane or FOV angular position onto a user's retina. The respective pluralities of LOEs 1090 and sub-light sources 1022 can therefore selectively project images (synchronously encoded by the SLM 1040 under the control of controller 1030) that appear to originate from various depth planes or positions in space. By sequentially projecting images using each of the respective pluralities of LOEs 1090 and sub-light sources 1022 at a sufficiently high frame rate (e.g., 360 Hz for six depth planes at an effective full-volume frame rate of 60 Hz), the system 1000 can generate a 3-D image of virtual objects at various depth planes that appear to exist simultaneously in the 3-D image.

The controller 1030 is in communication with and operatively coupled to the image generating processor 1010, the light source 1020 (sub-light sources 1022) and the SLM 1040 to coordinate the synchronous display of images by instructing the SLM 1040 to encode the light beams from the sub-light sources 1022 with appropriate image information from the image generating processor 1010.

The AR system also includes an optional eye-tracking subsystem 1050 that is configured to track the user's eyes and determine the user's focus. In one embodiment, only a subset of sub-light sources 1022 may be activated, based on input from the eye-tracking subsystem, to illuminate a subset of LOEs 1090, as will be discussed below. Based on input from the eye-tracking subsystem 1050, one or more sub-light sources 1022 corresponding to a particular LOE 1090 may be activated such that the image is generated at a desired depth plane that coincides with the user's focus/accommodation. For example, if the user's eyes are parallel to each other, the AR system 1000 may activate the sub-light sources 1022 corresponding to the LOE 1090 that is configured to deliver collimated light to the user's eyes (e.g., LOE 6 from FIG. 4), such that the image appears to originate from optical infinity. In another example, if the eye-tracking sub-system 1050 determines that the user's focus is at 1 meter away, the sub-light sources 1022 corresponding to the LOE 1090 that is configured to focus approximately within that range may be activated instead. It should be appreciated that, in this particular embodiment, only one group of sub-light sources 1022 is activated at any given time, while the other sub-light sources 1020 are deactivated to conserve power.

Figure 6:
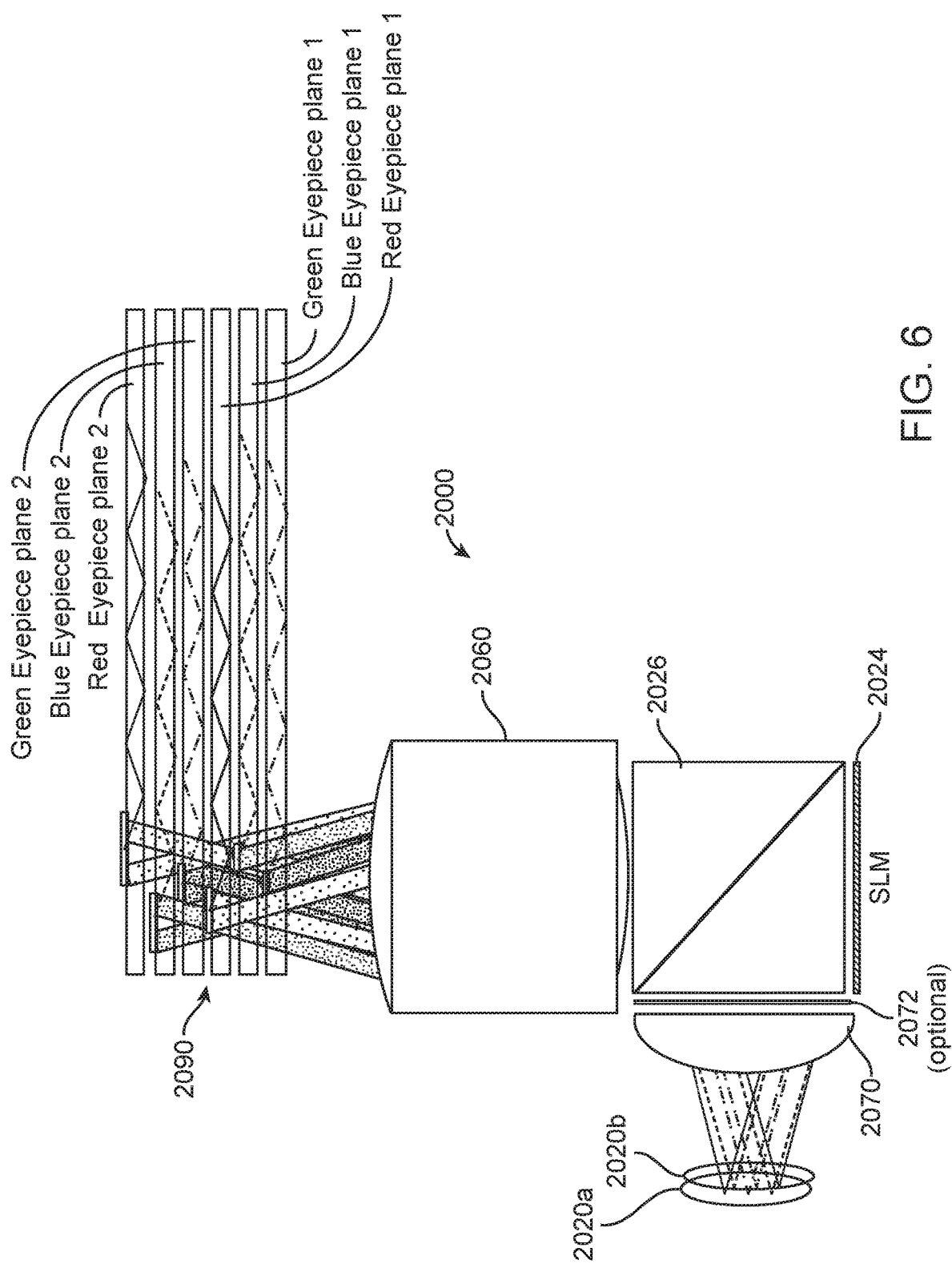
FIGS. 6 and 14 are detailed schematic views of various components of augmented reality systems according to two embodiments.
Figure 7A:
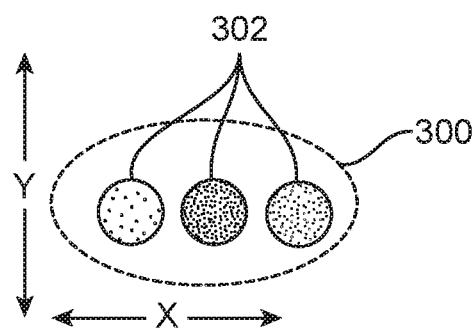
FIGS. 7A-7C, 8A-8C and 15A depict sub-pupil and super-pupil configurations generated by augmented reality systems according to various embodiments.
Figure 7B:
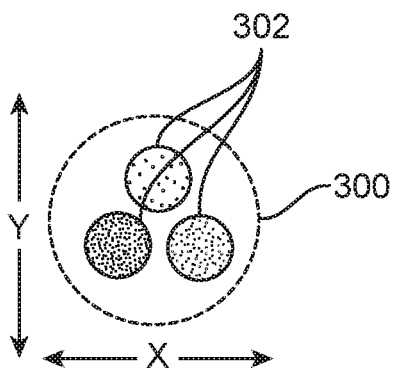
Figure 7C:
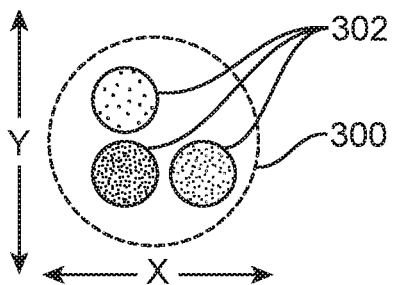

The AR system 2000 depicted in FIG. 6 is configured to generate sub-pupils 302 that are spatially separated in the X, Y and Z directions. The light source 2020 in this system 2000 includes two groups of sub-light sources 2022a, 2022b that are displaced from each other in the X, Y and Z (i.e., along the optical path) directions. The system 2000 also includes a condenser 2070, an optional polarizer 2072, a beam-splitter 2026, an SLM 2024, an injection optical system 2060 and a stack of LOEs 2090. In use, the plurality of light beams from the sub-light sources 2022a, 2022b pass through the above-listed system components in the order listed. The displacement of sub-light sources 2022a, 2022b in the X, Y and Z directions generates beams with focal points that are displaced in the X, Y and Z directions, thereby increasing the number of spatially separated sub-pupils 302 and LOEs 2090 that can be illuminated in the system 2000.

Figure 8A:
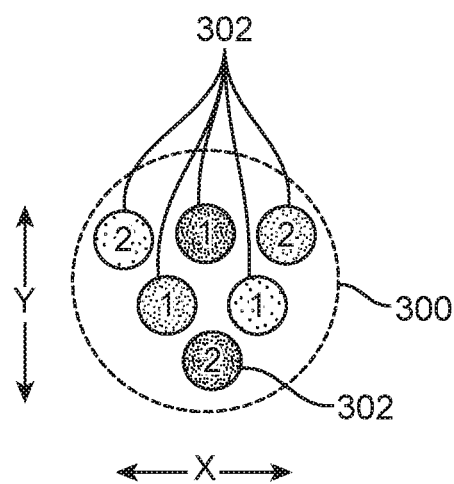
Figure 8B:
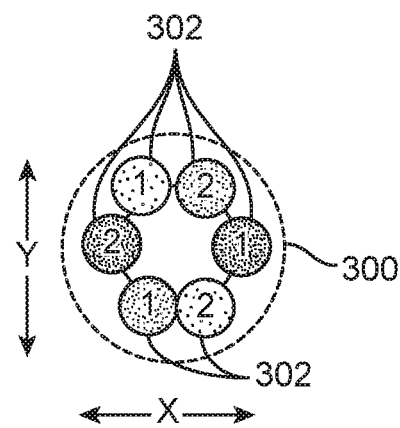
Figure 8C:
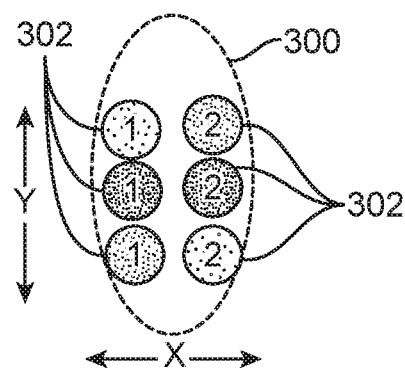

FIGS. 7A to 7C and 8A to 8C depict various spatial arrangements of sub-pupils 302 within a super-pupil 300 generated by various AR systems 2000 similar to the one depicted in FIG. 6. While the sub-pupils 302 are depicted as spatially separated in the X, Y plane, the sub-pupils 302 can also be spatially separated in the Z direction. Sub-pupils 302 formed by beams having the same color may be maximally spatially separated (as shown in FIGS. 8A to 8C) to reduce cross-talk between LOEs 2090 configured to propagate light of the same color. Further, in systems 2000 like the one depicted in FIG. 6, which form sub-pupils 302 separated from each other in Z direction, color and/or depth plane and/or field of view solid-angle segment can be switched by switching sub-light sources 2022a, 2022b without the need for shutters.

Figure 9:
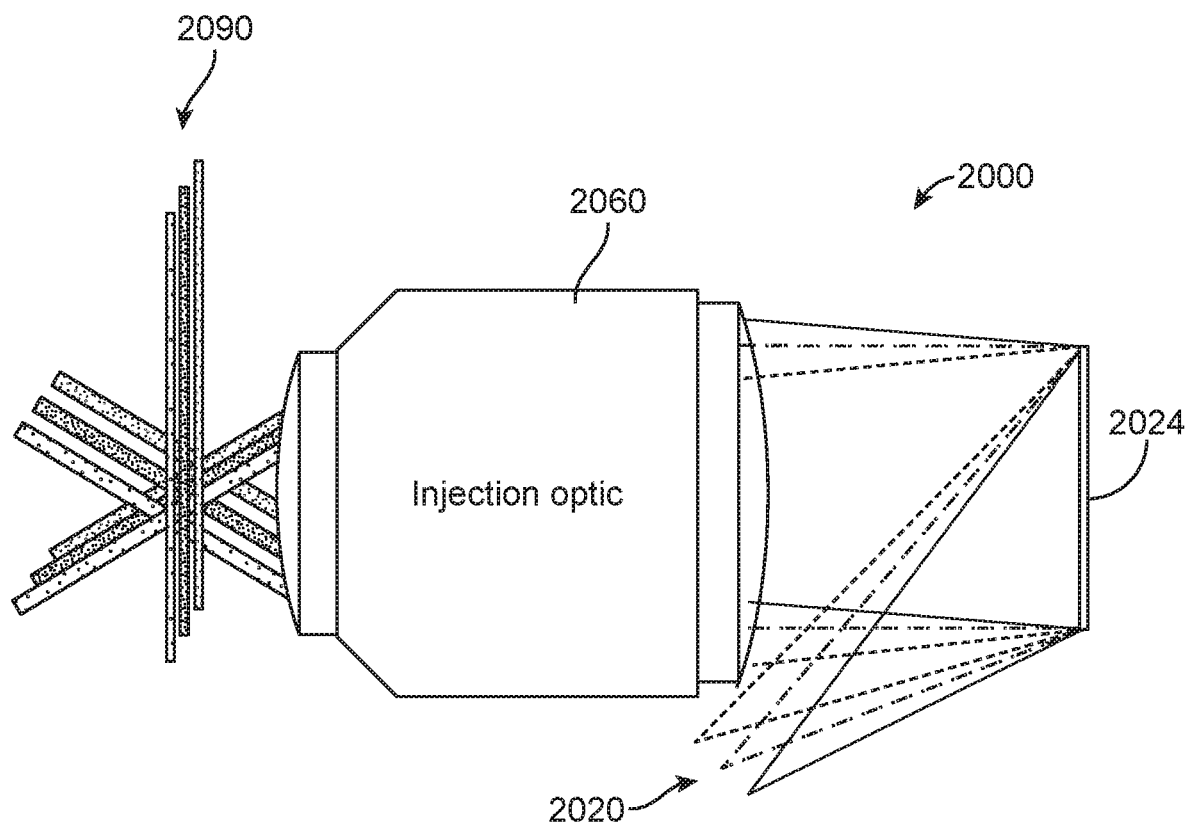
FIGS. 9 to 13 are schematic views of various components of augmented reality systems according to various embodiments.
Figure 10:
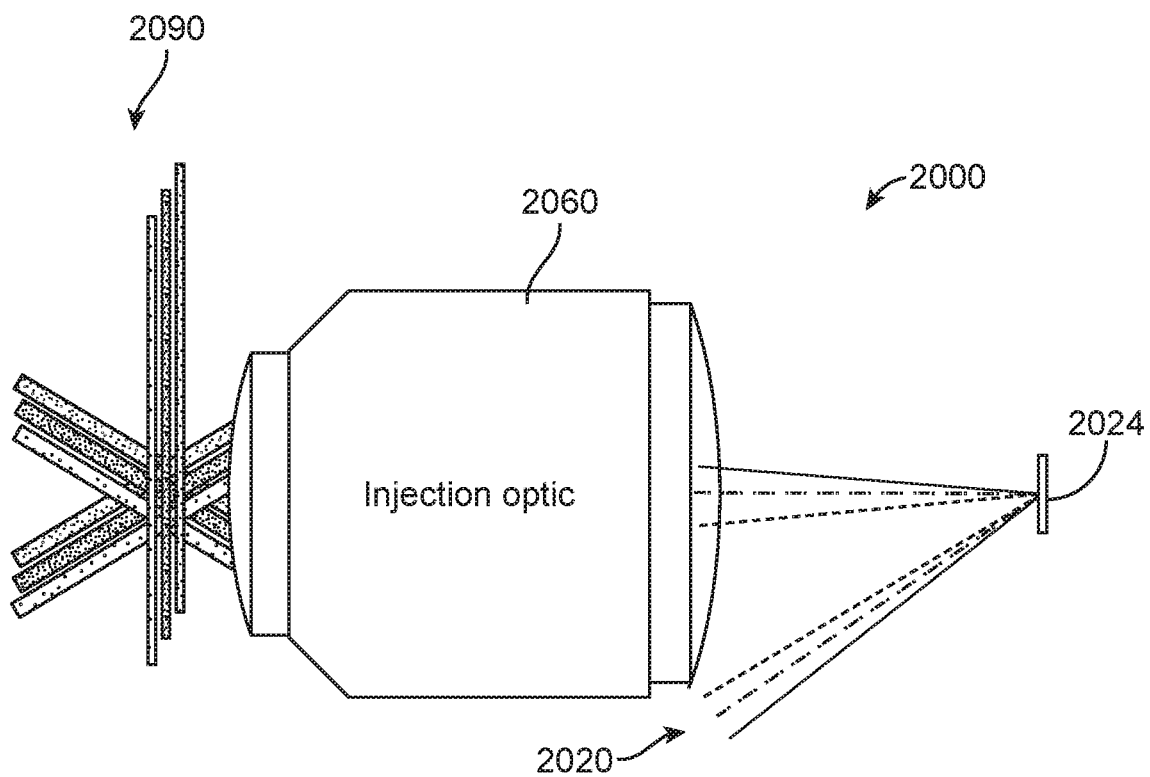
Figure 11:
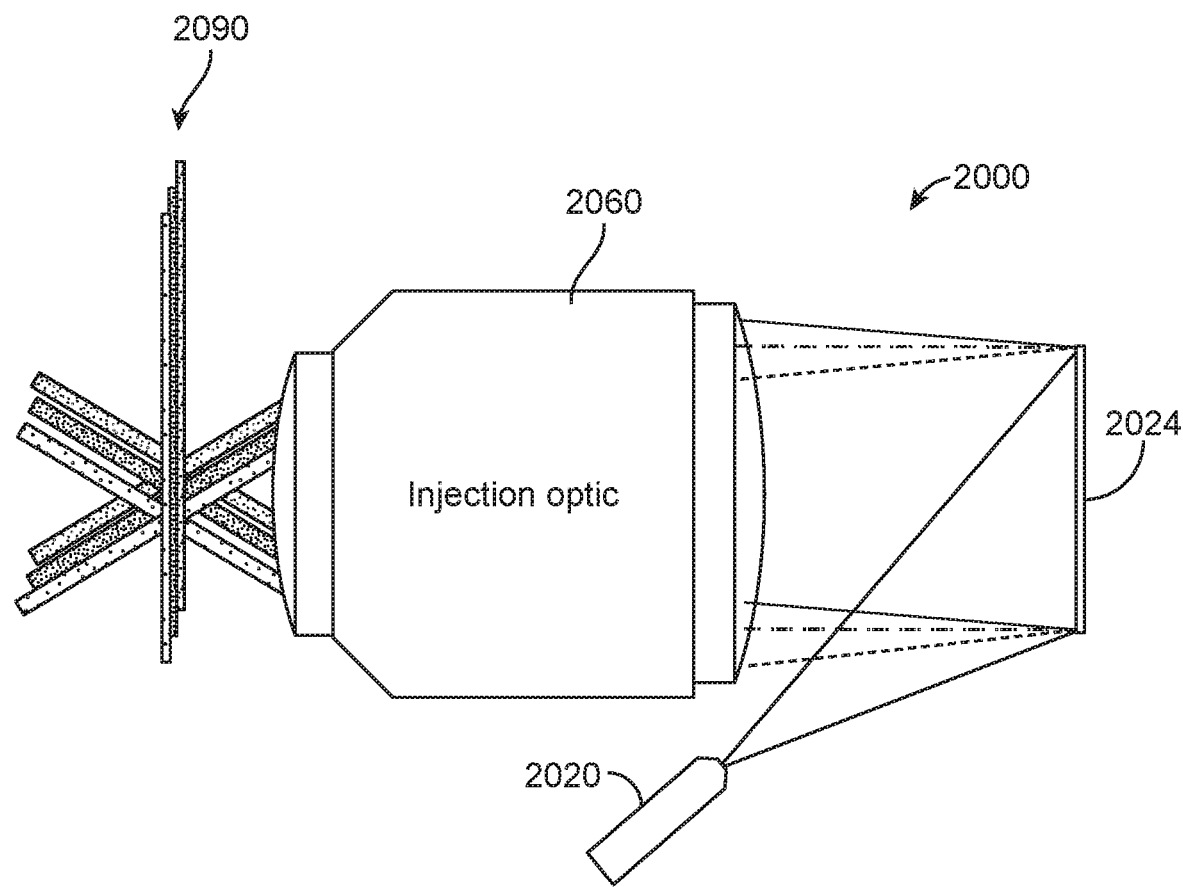

FIGS. 9 to 11 depict AR systems 2000 in which the light source 2020 (e.g., an angularly displaced RGB flat panel having spatially displaced red, green and blue sub-light sources (e.g., LEDs)) is angularly displaced (relative to the optical path) to produce spatially displaced color sub-pupils adjacent to respective LOEs 2090. Angularly displacing the light source 2020 changes the relative locations of the red, green and blue sub-light sources in the Z direction in addition to the X and Y directions. In FIG. 9, the spatially displaced light beams from the light source 2020 are encoded with image data using a digital light processing ("DLP") SLM 2024. The light beams reflecting off of the DLP SLM 2024 enter the injection optical 2060, which further spatially separates the light beams, thereby forming spatially separated sub-pupils corresponding to each beam. The spatially separated and collimated light beams enter respective LOEs 2090 through respective in-coupling gratings (not shown), and propagate in the LOEs 2090 as described above. In one embodiment, the three light beams depicted in FIG. 9 can be light of different wavelengths (e.g., red, green and blue). By modifying the configuration of various components of the AR system 2000, the spatial separation of the sub-pupils can be different from the spatial separation of the sub-light sources.

The system 2000 depicted in FIG. 10 is similar to the one depicted in FIG. 9, except that the beams from the light source 2020 are focused on the surface of the SLM 2024, which is a MEMS mirror SLM 2024. The injection optical system 2060 in FIG. 10 is configured to further spatially separate light reflecting from the mems mirror SLM 2024 to generate spatially separated sub-pupils corresponding to each beam.

The system 2000 depicted in FIG. 11 is similar to the one depicted in FIG. 9, except that the light source 2020 is a fiber scanned display ("FSD"), which is a combined RGB image source. The SLM 2024 is a volume-phase or blazed holographic optical element that both re-directs and spatially separates the RGB beam from the FSD 2020 into spatially separated sub-beams including different color light and/or light configured for different depth planes. In one embodiment, three sub-beams include red, green and blue light, respectively. The injection optical system 2060 in FIG. 11 functions similarly to the system 2060 in FIG. 9 to generate spatially separated sub-pupils corresponding to each sub-beam.

Figure 12:
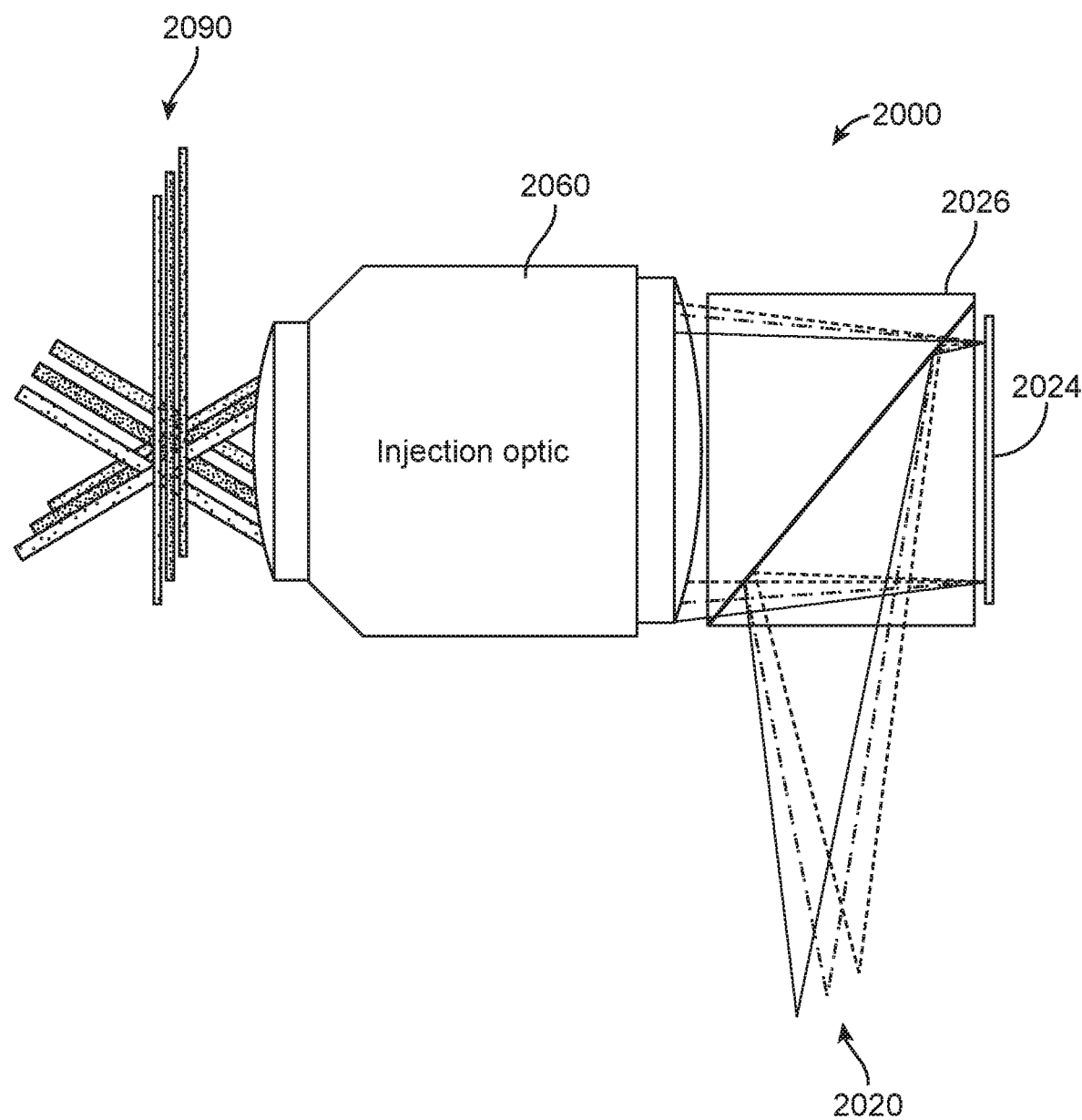

The system 2000 depicted in FIG. 12 is similar to the one depicted in FIG. 9, except that a beam-splitter 2026 is added to the optical path. Spatially displaced light beams from the light source 2020 reflect off the beam-splitter 2026 and onto the SLM 2024, which in this embodiment is an LCOS or an FLCOS. The spatially displaced light-beams reflect off the SLM 2024, through the beam-splitter 2026, and into the injection optical system 2060. The injection optical system 2060 in FIG. 12 functions similarly to the system 2060 in FIG. 9 to generate spatially separated sub-pupils corresponding to each beam.

Figure 13:
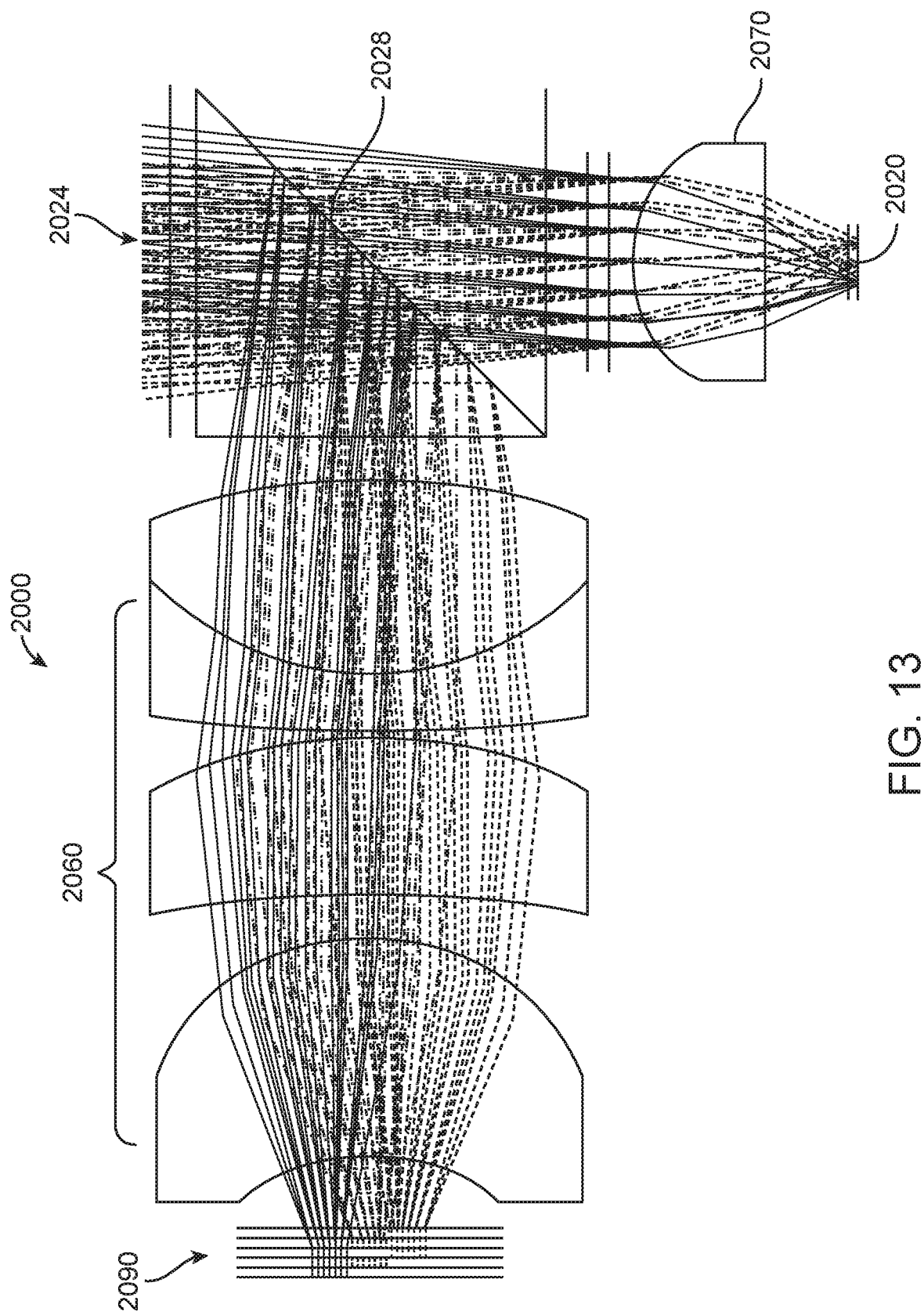
Figure 14:
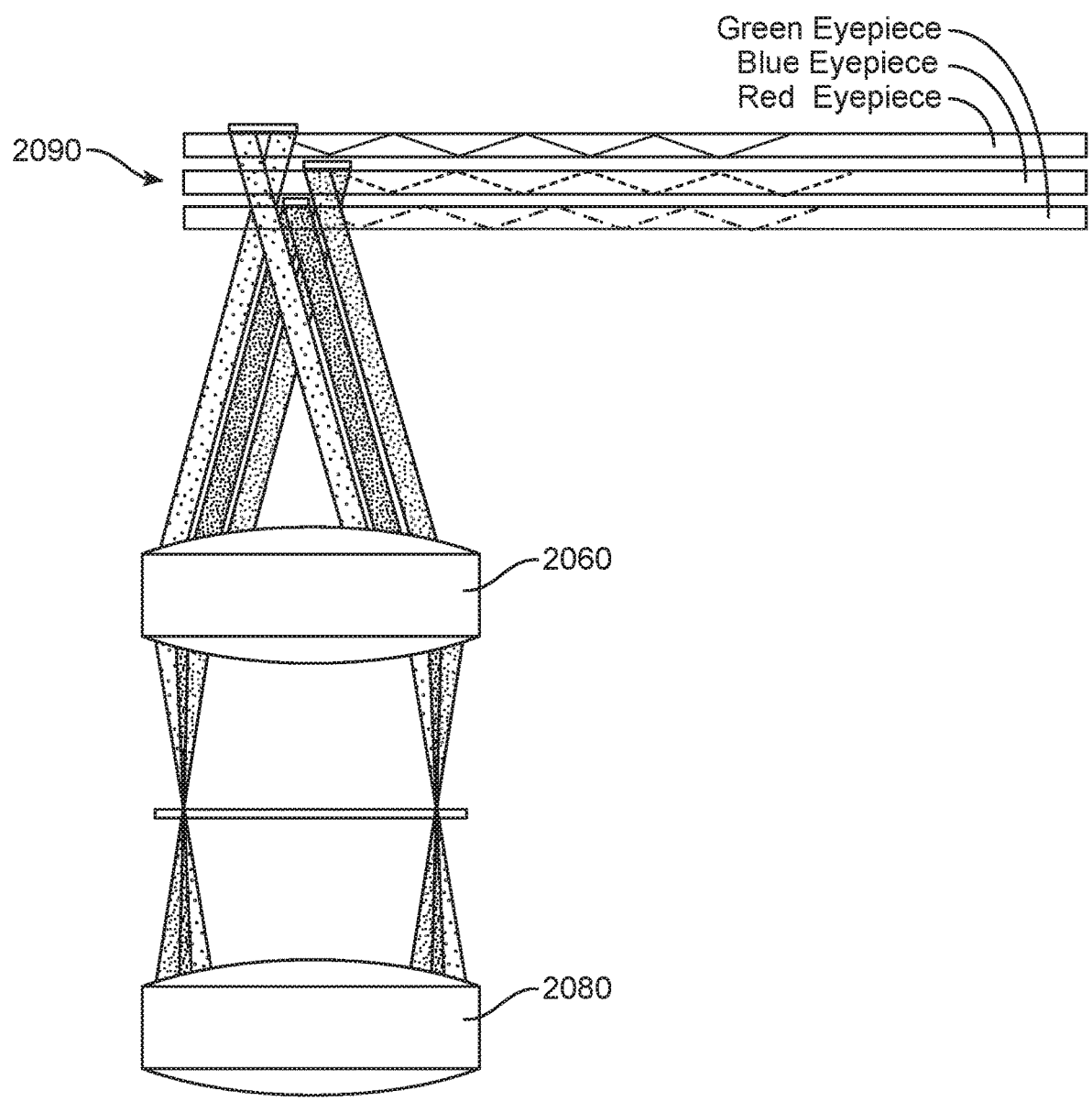

FIG. 13 depicts an AR system 2000 very similar to the one depicted in FIG. 12. In the system 2000 depicted in FIG. 10, the beam-splitter 2026 from the system 2000 depicted in FIG. 12 is replaced with the polarizing beam-splitter 2028, which may include a reflective wire-grid polarizer or a polarization-sensitive dichroic-coated layer. The AR system 2000 also includes a condenser 2070 disposed between the light source 2020 and the wire grid polarizer 2028. Light beams from the light source 2020 pass through the condenser 2070 and the polarizing beam-splitter 2028, and onto an LCOS SLM 2024. The light beams reflect off the SLM 2024 and the beam-splitter 2026, and into the injection optical system 2060. The injection optical system 2060 in FIG. 13 functions similarly to the system 2060 in FIG. 12 to generate spatially separated sub-pupils corresponding to each beam. FIG. 13 shows that the sub-pupils can be spatially separated in the X, Y and Z directions relative to the optical path. FIG. 13 depicts three lenses forming the injection optical system 2060, however other embodiments of injection optical systems 2060 can include fewer or more lenses. For instance, FIG. 14 depicts an AR system 2000 including an injection optical system 2060 having a relay lens 2080 to convert a divergent set of beams into a convergent set of beams and external pupils coincident on and for propagation by distinct LOEs 2090.

Figure 15A:
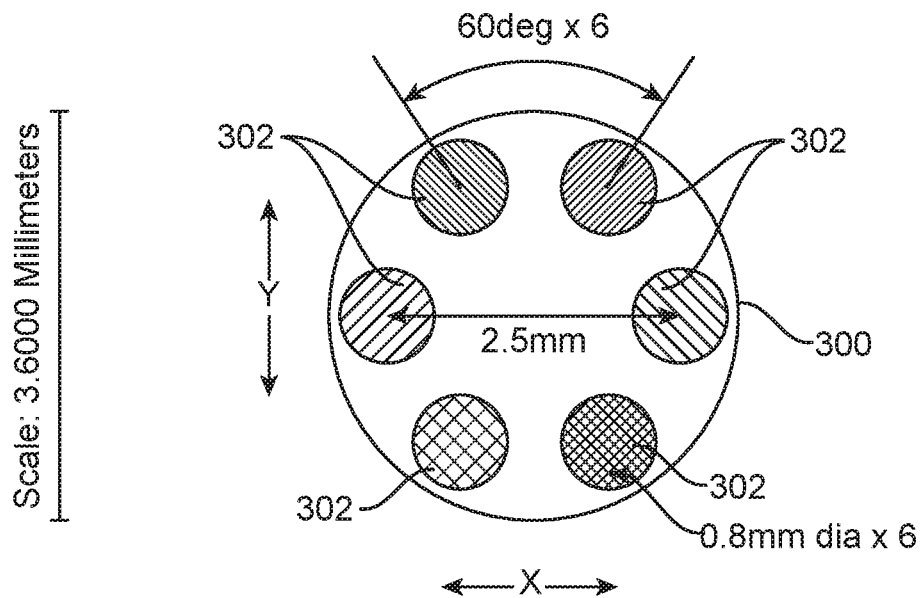
Figure 15B:
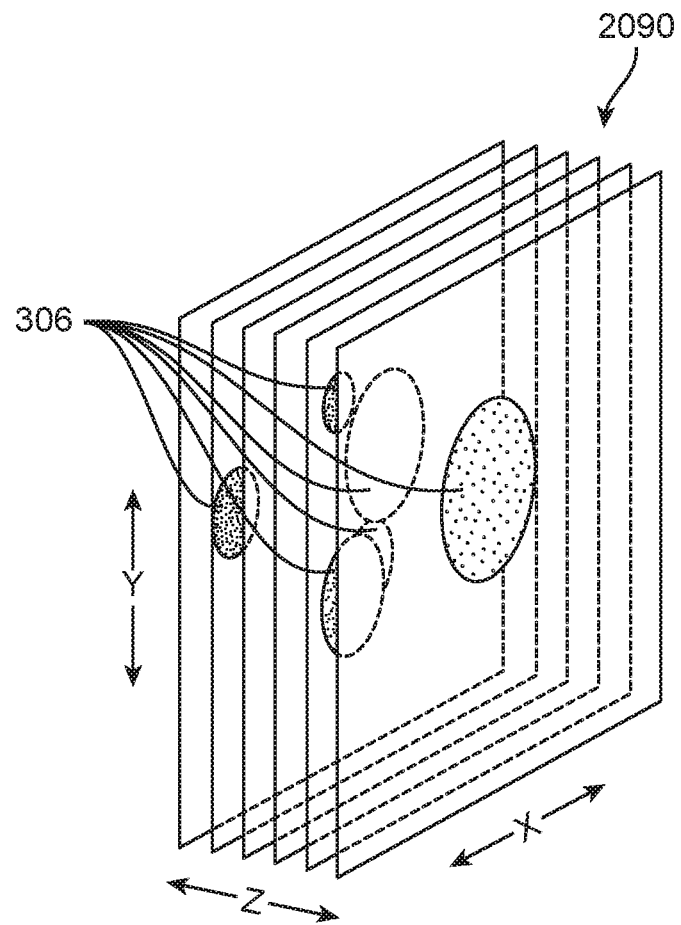
FIG. 15B depicts sub-pupils formed at the light-guiding optical elements of an augmented reality system according to one embodiment.

FIG. 15A depicts a spatial arrangement of sub-pupils 302 in the X, Y plane within a super-pupil 300 generated by an AR system 2000 according to one embodiment. FIG. 15B depicts a stack of six LOEs 2090 of the system 2000 and the respective areas 306 where the light beams forming the sub-pupils 302 depicted in FIG. 15A intersect each of the LOEs 2090. The areas 306 have different sizes due to the varying Z distances of the respective LOEs 2090 from the pupils 302 shown in FIG. 15A and other optical properties. As shown in FIG. 15B, the beams forming the various sub-pupils 302 can be selectively coupled into respective LOEs 2090 by forming in-coupling gratings adjacent the areas 306 on the respective LOEs 2090 that are addressed by the respective beams.

Figure 16:
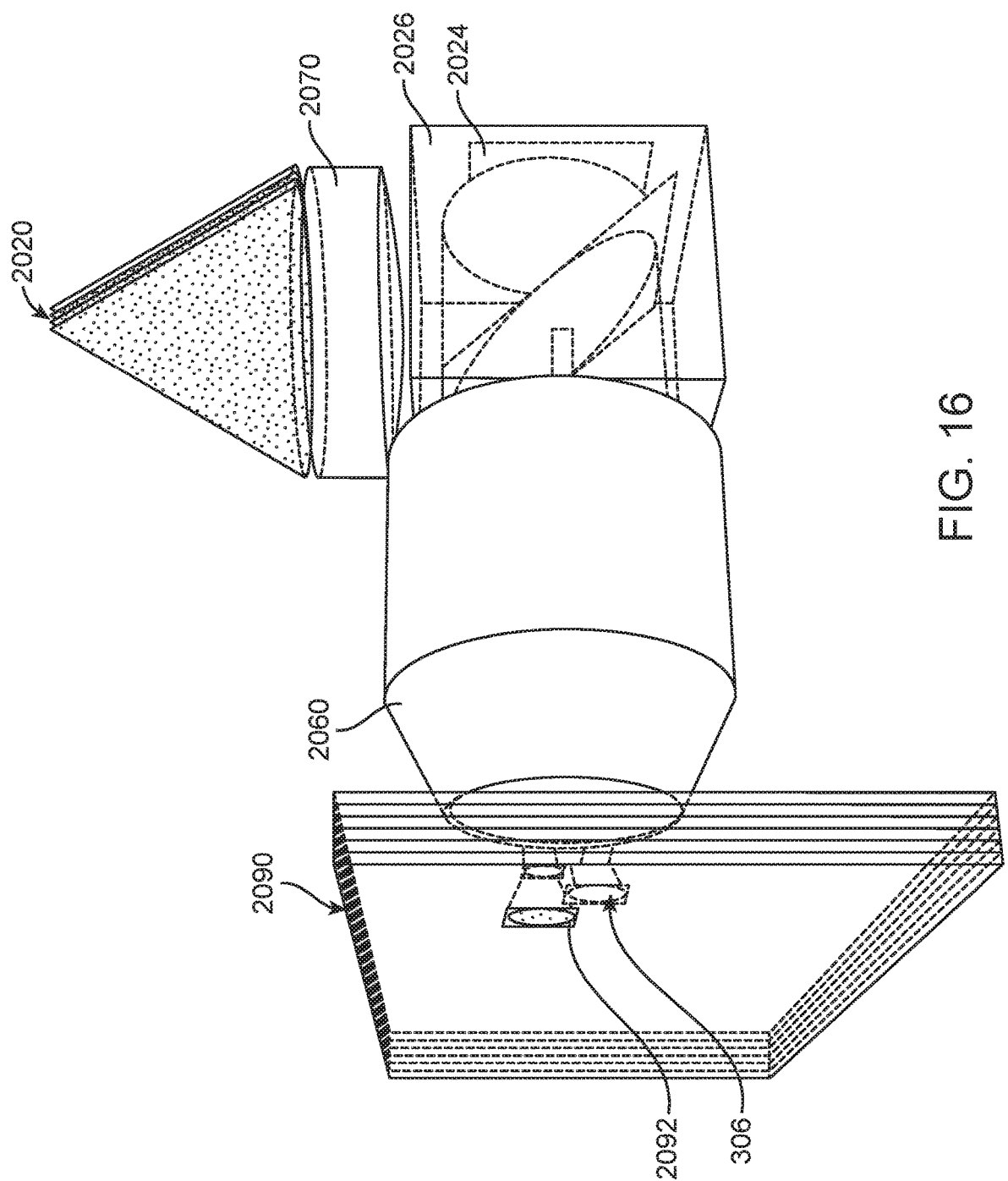
FIG. 16 is an exploded view of various components of an augmented reality system according to yet another embodiment.

FIG. 16 depicts another embodiment of an AR system 2000 that is configured to generate a spatial arrangement of sub-pupils 302 in the X, Y plane within a super-pupil 300 similar to the pattern depicted in FIG. 15A. The system 2000 includes a light source 2020 having a plurality of sub-light sources that are spatially separated from each other. The system 2000 also includes a condenser 2070, a polarizing beam-splitter 2026, an LCOS SLM 2024, an injection optical system 2060 and a stack of LOEs 2090. Each LOE 2090 of the stack has an in-coupling grating 2092 that is co-located with an area 306 of intersection by a distinct beam, as described above. Consequently, each beam is propagated along a single LOE 2090 to the user's eye.

The disclosed AR system 2000 utilizes spatially separated sub-light sources 2022 and injection optical systems 2060 to enable distinct beams and sub-pupils 302 to address in-coupling gratings configured to admit light into distinct LOEs 2090. Accordingly, the systems 2000 enable a plurality of sub-light sources 2022 to address respective LOEs 2090 while minimizing the number of optical components therebetween. This both reduces system size and increases system efficiency.

Other Embodiments and Features

Figure 17A:
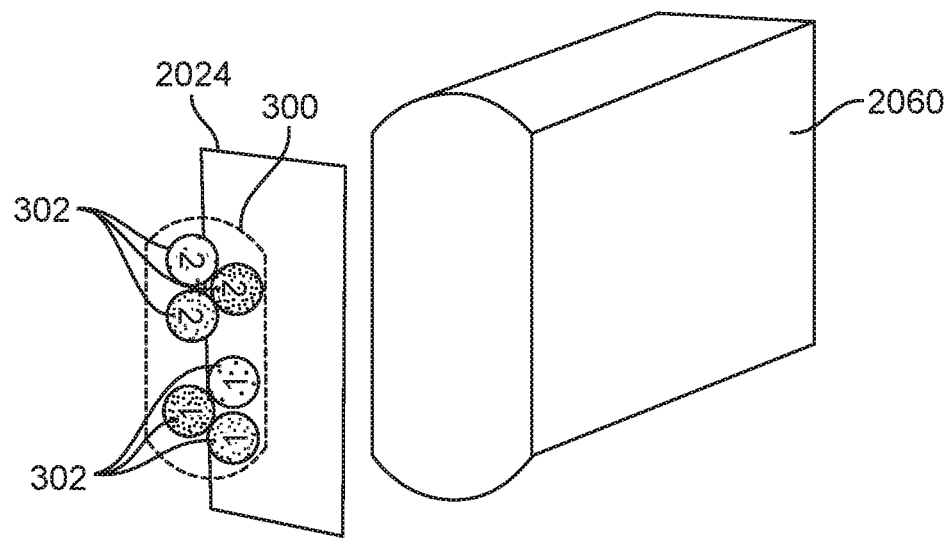
FIGS. 17A and 17B depict a narrow injection optical system of an augmented reality system according to one embodiment and the resulting sub-pupils and super-pupil formed thereby.
Figure 17B:
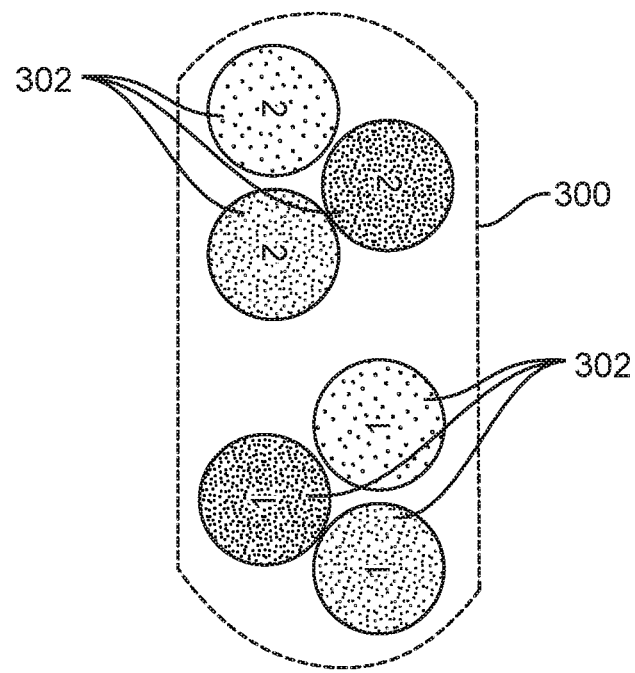

The geometry of optical components in the AR system 2000 can be selected to maintain spatial separation of sub-pupils 302 while reducing the size of the system. For instance, in FIG. 17A, the cross-sectional shape of injection optical system 2060 is a rounded rectangle (i.e., a rectangle with rounded corners and rounded short sides). As shown in FIGS. 17A and 17B, if the beams addressing the SLM 2024 are spatially separated from each other, the injection optical system 2060 in this embodiment will form similar spatially separated sub-pupils 302.

Figure 18A:
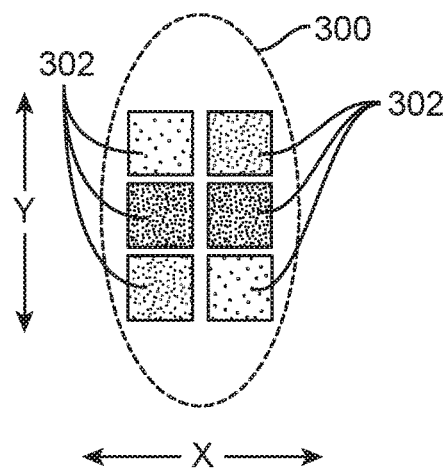
FIGS. 18A-18C and 19 depict sub-pupil and super-pupil shapes and configurations generated by augmented reality systems according to various embodiments.
Figure 18B:
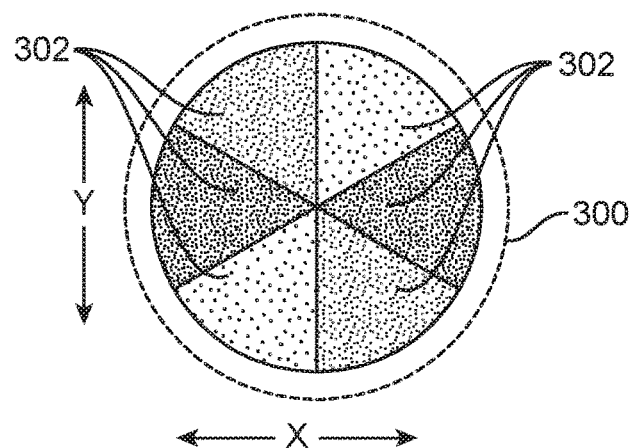
Figure 18C:
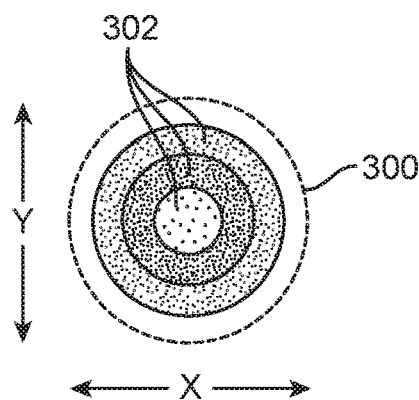

FIGS. 18A to 18C depict various spatial arrangements and shapes of sub-pupils 302 in the X, Y plane within respective super-pupils 300 generated by various AR systems 2000. In addition to controlling the spatial arrangements of sub-pupils 302, the AR systems 2000 are also configured to control the shape of the sub-pupils. The various sub-/super-pupil shapes include square/oval (FIG. 18A), pie/circle (FIG. 18B) and concentric annuli/circle (FIG. 18C). In one embodiment, the pupil shapes are formed by masking/filtering at or near the sub-light sources 2022. In another embodiment, the pupil shapes are formed using diffractive optics. In still another embodiment (e.g., FIG. 18C), the pupil shapes are formed by Z axis displacement of sub-light sources 2022.

Figure 19:
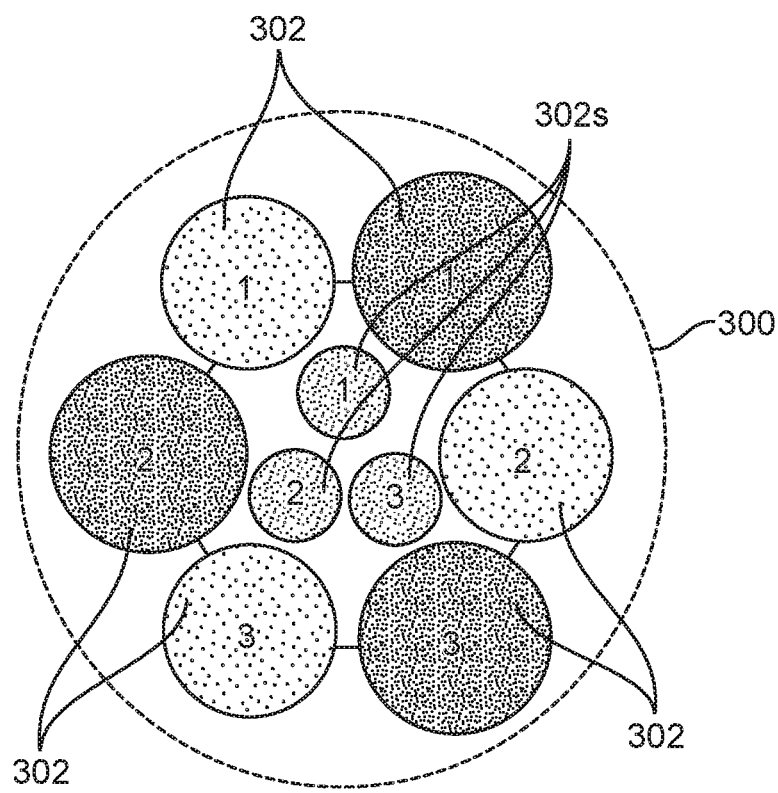

FIG. 19 depicts another spatial arrangement of sub-pupils 302 in the X, Y plane within a super-pupil 300 generated by an AR system 2000. In addition to spatial displacement, the sub-pupils 302, 302s in FIG. 19 also have two or more sizes. In one embodiment, the smaller sub-pupils 302s are formed by beams including blue light, and larger sub-pupils 302 are formed by beams including red and green light. An AR system 2000 forming the sub-pupil pattern shown in FIG. 19 can take advantage of the human eye's reduced ability to focus blue light (e.g., relative to red and green light) and increased ability to focus green light (e.g. relative to red and blue light) to present more pupils, and therefore more visual information, in a super-pupil 300 of a given size (e.g., by displaying blue sub-pupils 302s having a reduced size).

Modulating the size (e.g., diameter) of the sub-pupils 302, 302s (e.g., based on the size and/or optics associated with the light sources) facilitates more efficient optical system design. Larger sub-pupils (e.g., 302) can provide increased image resolution in optical systems compared to sub-smaller pupils (e.g., 302s). Accordingly, designing an optical system having a plurality of sub-pupil sizes enables selection of depth of focus based on color and/or depth plane being addressed. Optical systems 2000 can include smaller blue light sources and larger red and green light sources to achieve smaller blue sub-pupils 302s. This design takes advantage of the human eye's inability to focus blue light as well as red and green light. As a result, blue light resolution can be lower than the resolution for red and green light. This design allows for an improved mix of sub-pupils 302, 302s within the super-pupil 300 of the optical system 2000, and may also allow for more sub-pupils 302, 302s (and therefore more depth plane channels) to be incorporated without substantially increasing the size of the optical system 2000.

FIGS. 20A and 20B depict two sets of sub-pupils 302 in the X, Y plane within respective super-pupils 300 generated by respective AR systems 2000. While the areas of corresponding sub-pupils 302 in FIGS. 20A and 19B are approximately equal, the shapes of the sub-pupils 302 in FIGS. 20A (circles) and 20B (rectangles) are different. An AR system 2000 forming the sub-pupil pattern shown in FIG. 20B can take advantage of the human eye's focus being preferentially driven by one dimension (e.g., the long axis of the rectangular sub-pupil 300) over the other (e.g., the short axis of the rectangular sub-pupil 300) to enable more efficient sub-pupil stacking relative to user focus.

The sub-pupil 302 shape in FIG. 20B can also reduce the size of in-coupling gratings 2092 (compare FIG. 20D to FIG. 20C). This, in turn, reduces the number of encounters of the beam with the in-coupling grating 2092, which reduces unintended out-coupling of light from the LOE 2090 (by second encounters with the in-coupling grating 2092), thereby increasing the intensity of the beam propagated along the LOE 2090.

Figure 21:
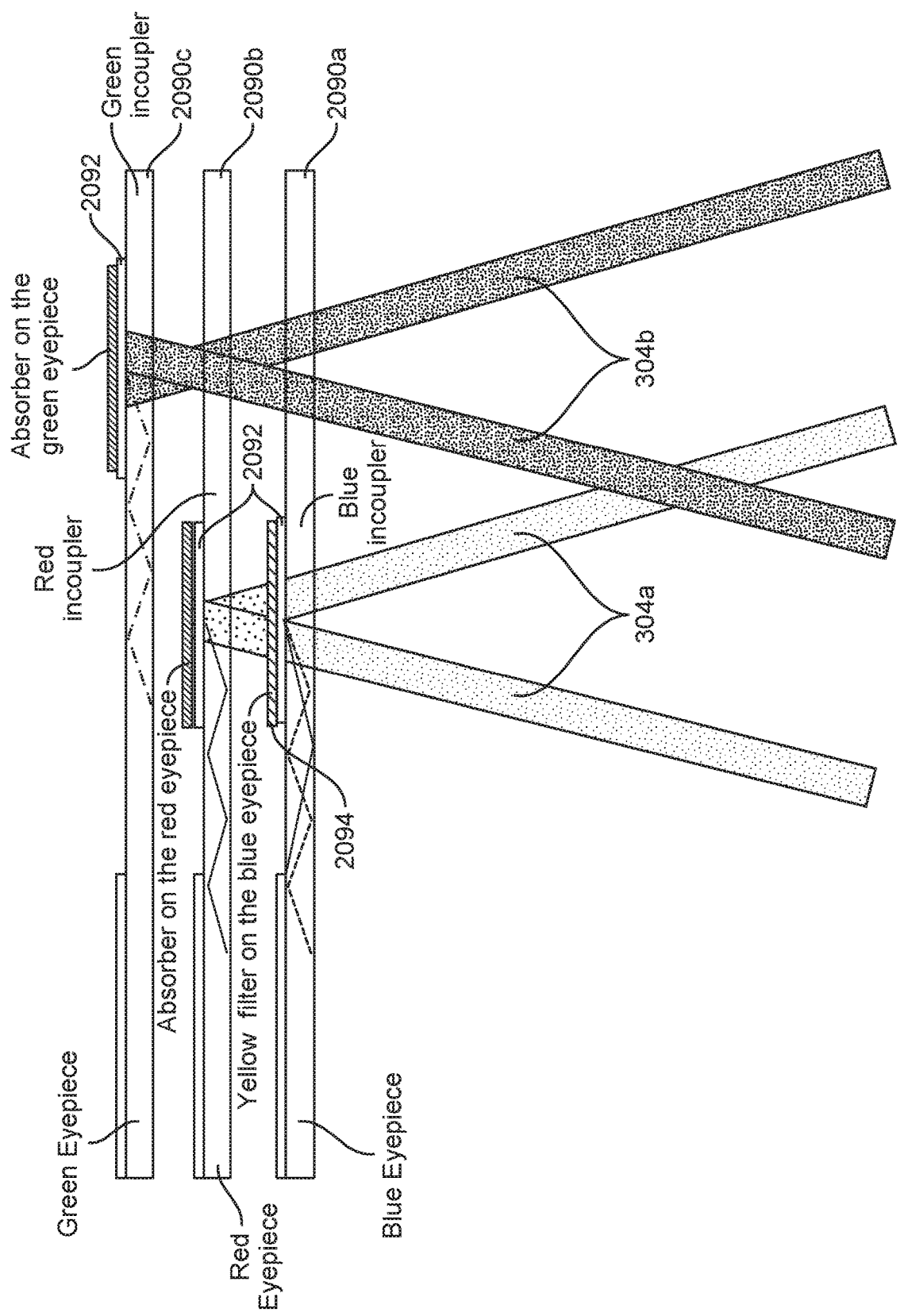
FIG. 21 depicts light-guiding optical elements of an augmented reality system according to one embodiment, where the light-guiding optical elements are configured for use with specific wavelengths of light.

FIG. 21 depicts an AR system 2000 where two light beams are configured to provide light that propagates along three LOEs 2090. The system 2000 includes sub-light sources (not shown) and an SLM (not shown) that generate first and second light beams 304a, 304b that are spatially separated from each other. The first light beam 304a includes both red and blue light, forming a magenta beam. The second light beam 304b includes green light. The first beam 304a is aligned (e.g., by the injection optical system (not shown)) with in-coupling gratings 2092 formed on first and second LOEs 2090a, 2090b, which are tuned to propagate blue and red light, respectively. Due to the properties of the first LOE 2090a, any red light entering the first LOE 2090a will not be propagated therein. A yellow filter 2094 is placed between in-coupling gratings 2092 formed on first and second LOEs 2090a, 2090b to absorb any blue light passing through the first LOE 2090a. Accordingly, only red light from the first beam 304a enters the second LOE 2090b and is propagated therein.

As with previously described AR systems, the second beam 304b passes through the first and second LOEs 2090a, 2090b and enters the third LOE 2090c (through in-coupling grating 2092), which is tuned to propagate green light. The AR system 2000 depicted in FIG. 21 takes advantage of the ability to combine red and blue light in a single beam to reduce the number of beams (and sub-light sources) to provide light for LOEs of differing primary colors, thereby reducing the size of the AR system 2000.

Figure 22A:
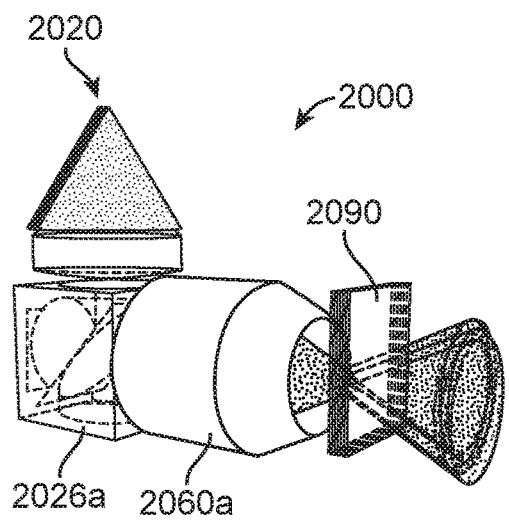
FIGS. 22A and 22B are exploded views of components of augmented reality systems according to two embodiments.
Figure 22B:
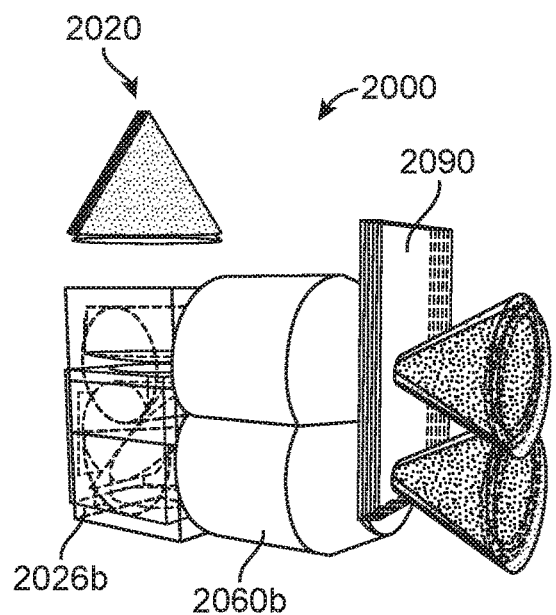
Figure 22C:
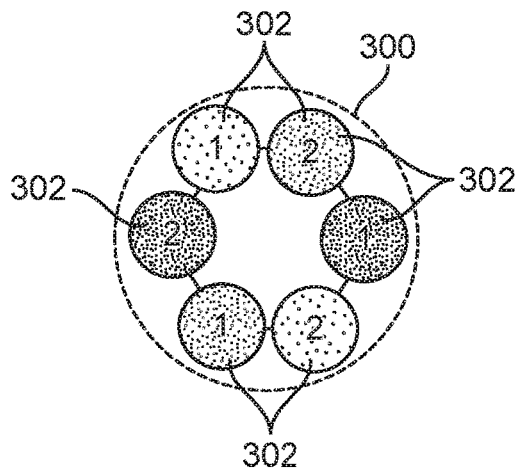
FIGS. 22C and 22D depict sub-pupil and super-pupil configurations generated by the augmented reality systems depicted in FIGS. 22A and 22B, respectively.

FIGS. 22A and 22B depict two alternative AR systems 2000 having injection optical systems 2060a, 2060b with different geometries. As a result, the AR systems 2000 generate different sub-pupil 302/super-pupil 300 patterns (see FIGS. 22C and 22D). The AR systems 2000 depicted in FIGS. 22A and 22B also have beam-splitters 2026a, 2026b with different geometries and optical properties to conform to the shapes of the respective injection optical systems 2060a, 2060b. As can be seen from the sub-pupil 302/super-pupil 300 patterns in FIGS. 22C and 22D, the AR system 2000 depicted in FIG. 22B generates twice as many sub-pupils 302 as the AR system 2000 depicted in FIG. 22A in less than twice the super-pupil 300 size. Similar size savings extends to the injection optical systems 2060a, 2060b and the beam-splitters 2026a, 2026b, as shown in FIGS. 22A and 22B.

Figure 22D:
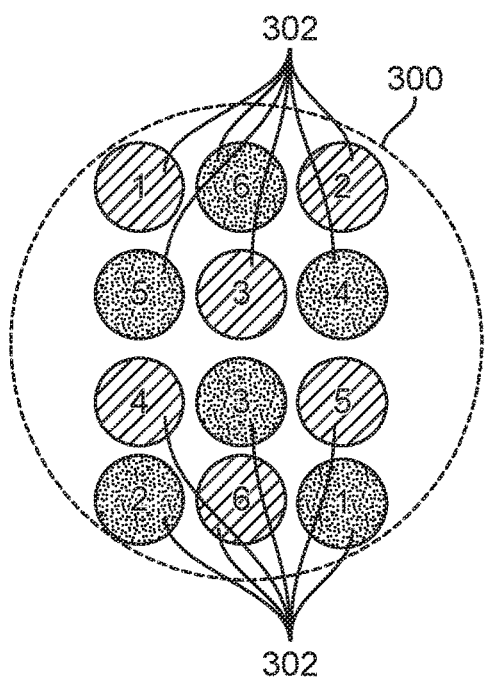

In one embodiment, the six sub-pupils 302 in the pattern depicted in FIG. 22D include magenta light, similar to the system 2000 depicted in FIG. 21. Using magenta light and LOE 2090 structures like those depicted in FIG. 21, the AR system 2000 depicted in FIG. 22B can provide light for three times as many LOEs 2090 as the AR system 2000 depicted in FIG. 22A. For instance, the AR system 2000 depicted in FIG. 22A generates six sub-pupils 302 to provide light for six LOEs 2090 (e.g., two depth layers with three colors each). On the other hand, the AR system 2000 depicted in FIG. 22B generates 12 sub-pupils 302 to provide light for 18 LOEs 2090 (e.g., six depth layers with three colors each). This three-fold increase in the number of LOEs 2090 is achieved with less than a two-fold increase in super-pupil 300 size, injection optical system 2060 size and beam-splitter 2026 size.

Figure 23:
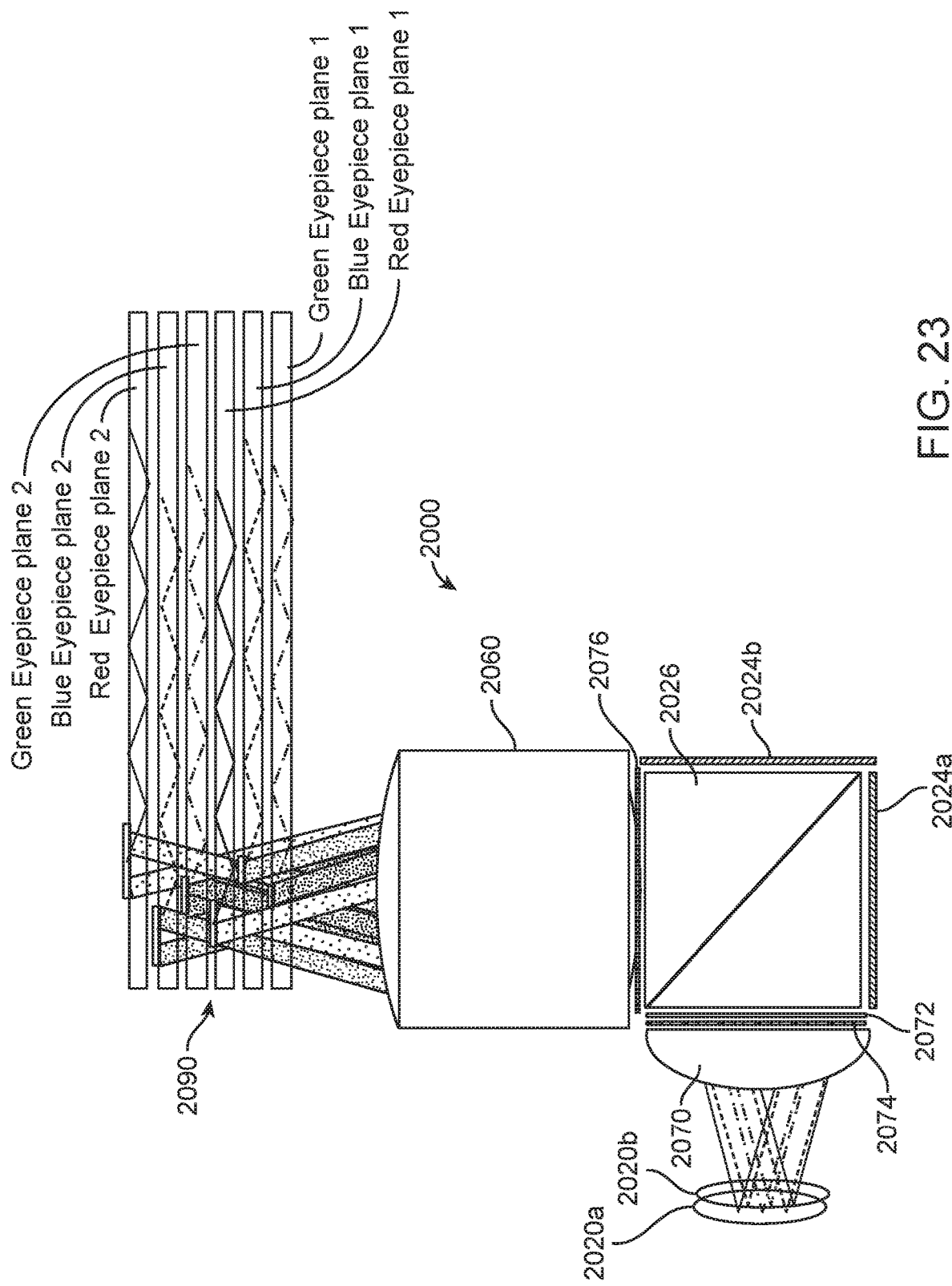
FIGS. 23 and 24 are schematic views of components of augmented reality systems according to two embodiments, wherein the systems have two SLMs.

FIG. 23 depicts still another embodiment of an AR system 2000. Like the AR system 2000 depicted in FIG. 13, this AR system 2000 includes a light source 2020 having two groups of sub-light sources 2022a, 2022b, a condenser 2070, an optional polarizer 2072, a beam-splitter 2026, a first SLM 2024a, an injection optical system 2060 and a stack of LOEs 2090. In addition to those optical elements, the system 2000 also includes an optional half-wave plate 2074 (between the condenser 2070 and the optional polarizer 2072), a second SLM 2024b (between the beam splitter 2026 and the injection optical system 2060) and a depolarizer 2076 (between the first and second SLMs 2024a, 2024b and the injection optical system 2060).

In use, the plurality of light beams from the sub-light sources 2022a, 2022b pass through or reflect off of the above-listed system components in the order listed, as modified by the three added components. As with the AR system 2000 depicted in FIG. 13, the displacement of sub-light sources 2022a, 2022b in the Z direction generates beams with focal points that are displaced in the Z direction, thereby increasing the number of spatially separated sub-pupils 302 and LOEs 2090 that can be illuminated in the system 2000. In some embodiments, the first and second SLMs 2024a, 2024b can have superimposed image fields and can be alternatively activated to reduce system latency and increase frame rate (e.g., using two 30 Hz SLMs 2024a, 2024b to project images at 60 Hz). In alternative embodiments, the first and second SLMs 2024a, 2024b can have image fields that are displaced by half a pixel and be concurrently activated to increase system resolution. In those embodiments, the first and second SLMs 2024a, 2024b can be configured to increase the number of depth planes by temporal multiplexing. In another embodiment, the first and second SLMs 2024a, 2024b can produce image fields simultaneously, such that two depth planes may be displayed simultaneously within the viewer field of view.

Figure 24:
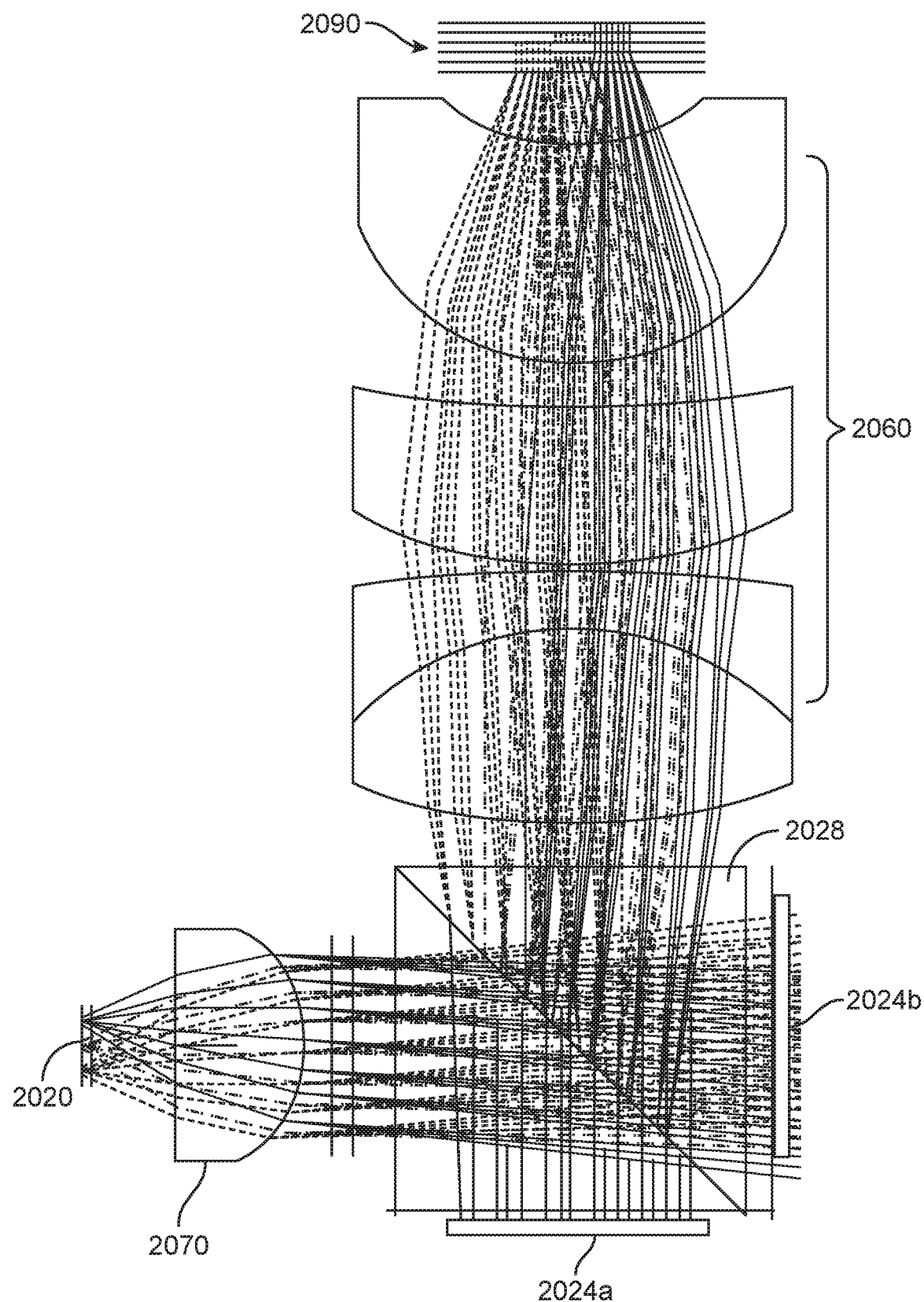

FIG. 24 depicts an AR system 2000 very similar to the one depicted in FIG. 23. In the system 2000 depicted in FIG. 24, the beam-splitter 2026 from the system 2000 depicted in FIG. 23 is replaced with the wire grid polarizer 2028, eliminating the need for the optional polarizer 2072 in FIG. 23. The system 2000 in FIG. 24 functions in a very similar fashion to the system 2000 in FIG. 23 to accommodate two SLMs 2024a, 2024b, which is described above. FIG. 24 depicts three lenses forming the injection optical system 2060, however other embodiments of injection optical systems 2060 can include fewer or more lenses.

Figure 25:
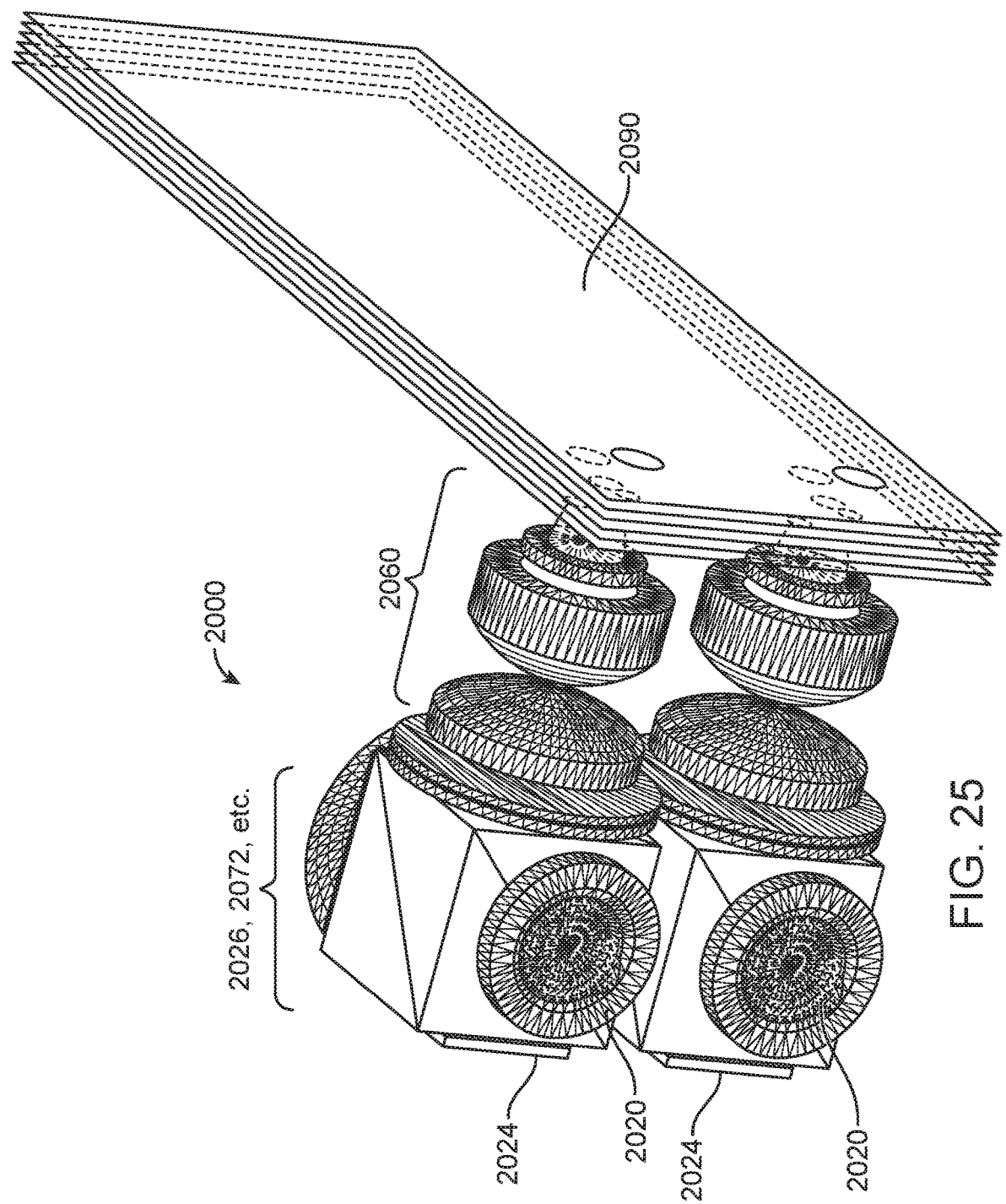
FIG. 25 is a schematic view of various components of an augmented reality system according to another embodiment.

FIG. 25 depicts yet another embodiment of an AR system 2000. The system 2000 includes two sets of light sources 2020, SLMs 2024, illumination-shaping optics (beam-splitters 2026, polarizers 2072, etc.), injection optics 2060 configured to cooperatively direct light (and image data) to a stack of LOEs 2090. The independent sets of optical elements generate independent sets of sub-pupils that are spatial separated from each other, thereby effectively doubling the number of LOEs 2090 that can be illuminated with the system 2000 while minimizing system 2000 size.

Figure 26:
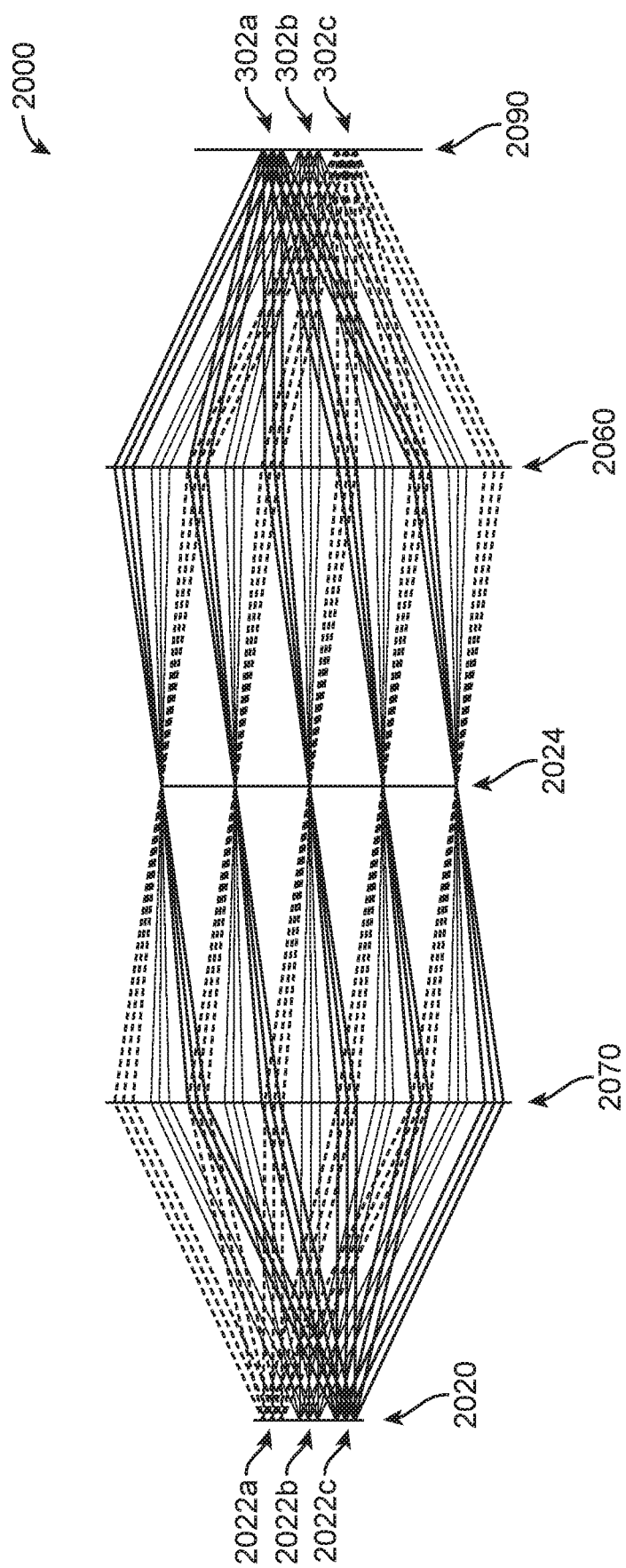
FIGS. 26 to 28 and 30 are diagrams depicting components of augmented reality systems according to various embodiments.

FIG. 26 schematically depicts a simple AR system 2000 configured to generate spatially separated sub-pupils 302. The system 2000 includes a light source 2020, a condenser 2070, a transmissive SLM 2024, an injection optical system 2060, and an LOE 2090. The light source 2020 can include three sub-light sources 2022a, 2022b, 2022c (e.g., LEDs) having 400 µm diameters and spaced 400 µm apart from each other (edge to edge). The condenser 2070 and the injection optical system 2060 can each have an effective focal length of 6.68 mm. The transmissive SLM 2024 can be a LCOS having specifications of 1080×1080×4.2 um and 3.2074 mm semi-d. Using such components, the system 2000 can generate three sub-pupils 302a, 302b, 302c corresponding to the three sub-light sources 2022a, 2022b, 2020c and each having 400 µm diameters and spaced 400 µm apart from each other at the LOE 2090.

Figure 27:
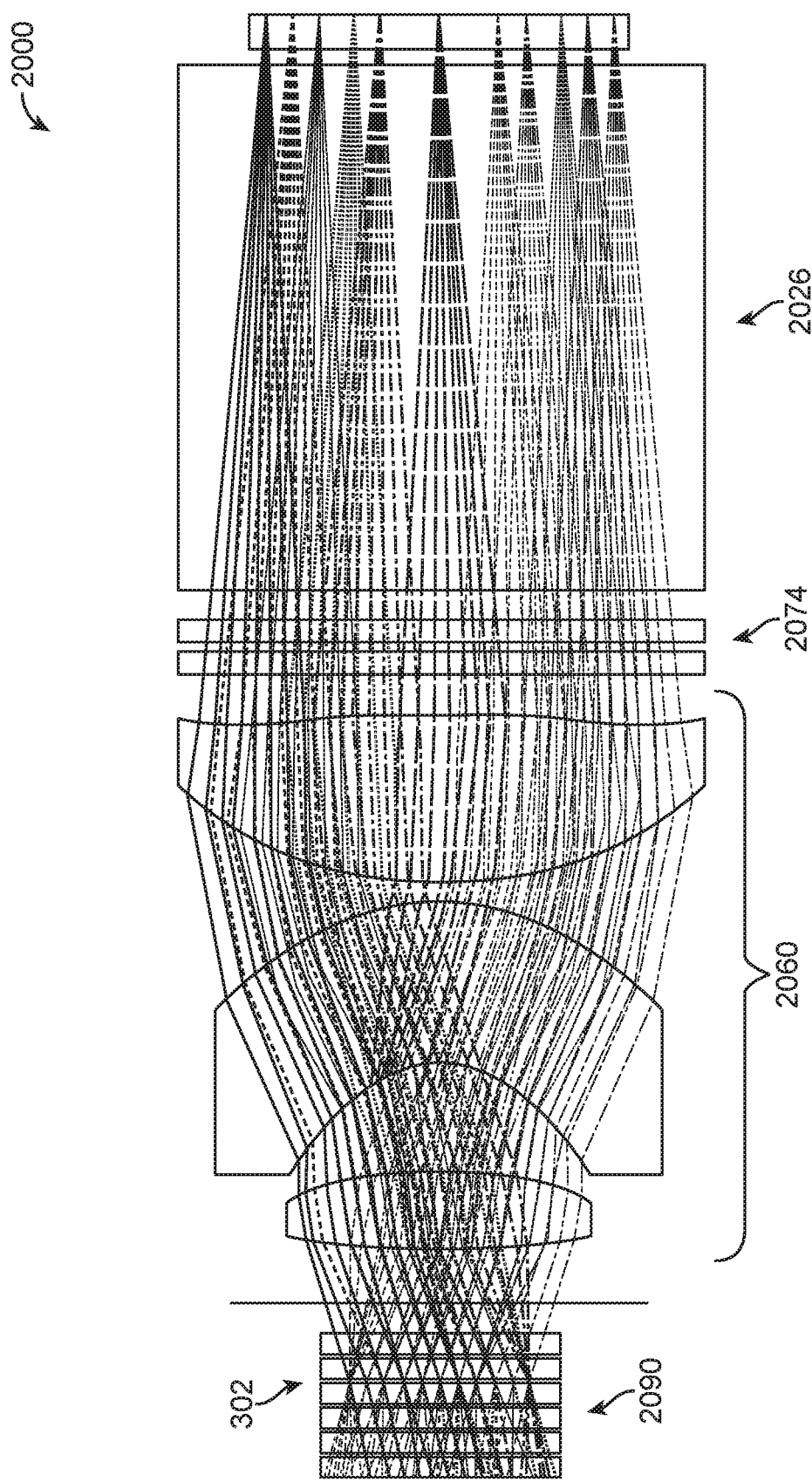

FIG. 27 depicts another embodiment of an AR system 2000 configured to generate a sub-pupil 302. The system 2000 includes a sub-light source (not shown), a beam-splitter 2026, half-wave plate 2074, an injection optical system 2060, and a plurality of LOE 2090. The light source 2020 can include a plurality of sub-light sources (e.g., LEDs). The beam-splitter 2026 can be a 10 mm polarizing beam splitter (PBS) prism. The injection optical system 2060 can include three lenses. Using such components, the system 2000 can generate a sub-pupil 302 disposed at the back of the second LOE 2090 in the six LOE 2090 stack and corresponding to the sub-light source.

Figure 28:
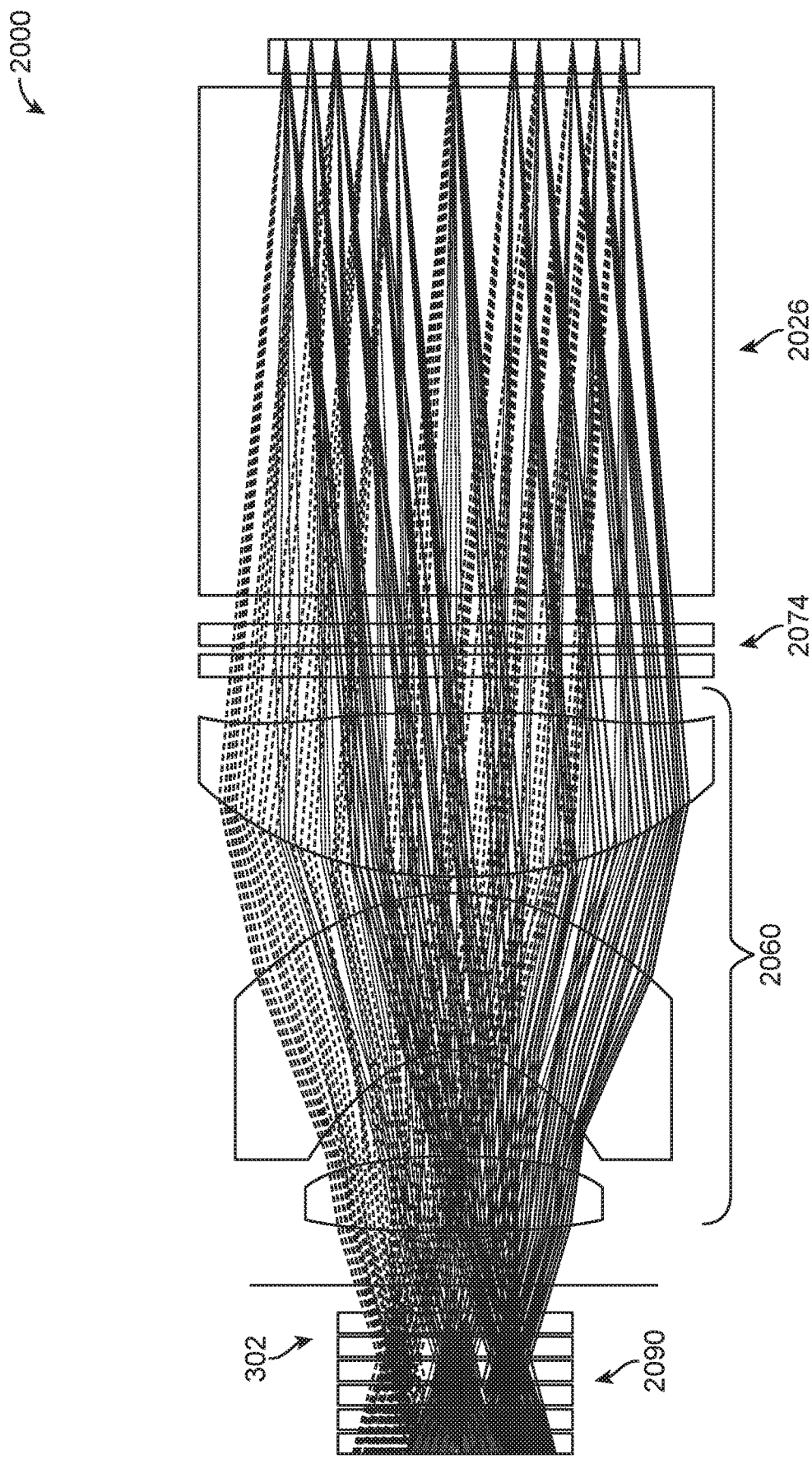
Figure 29:
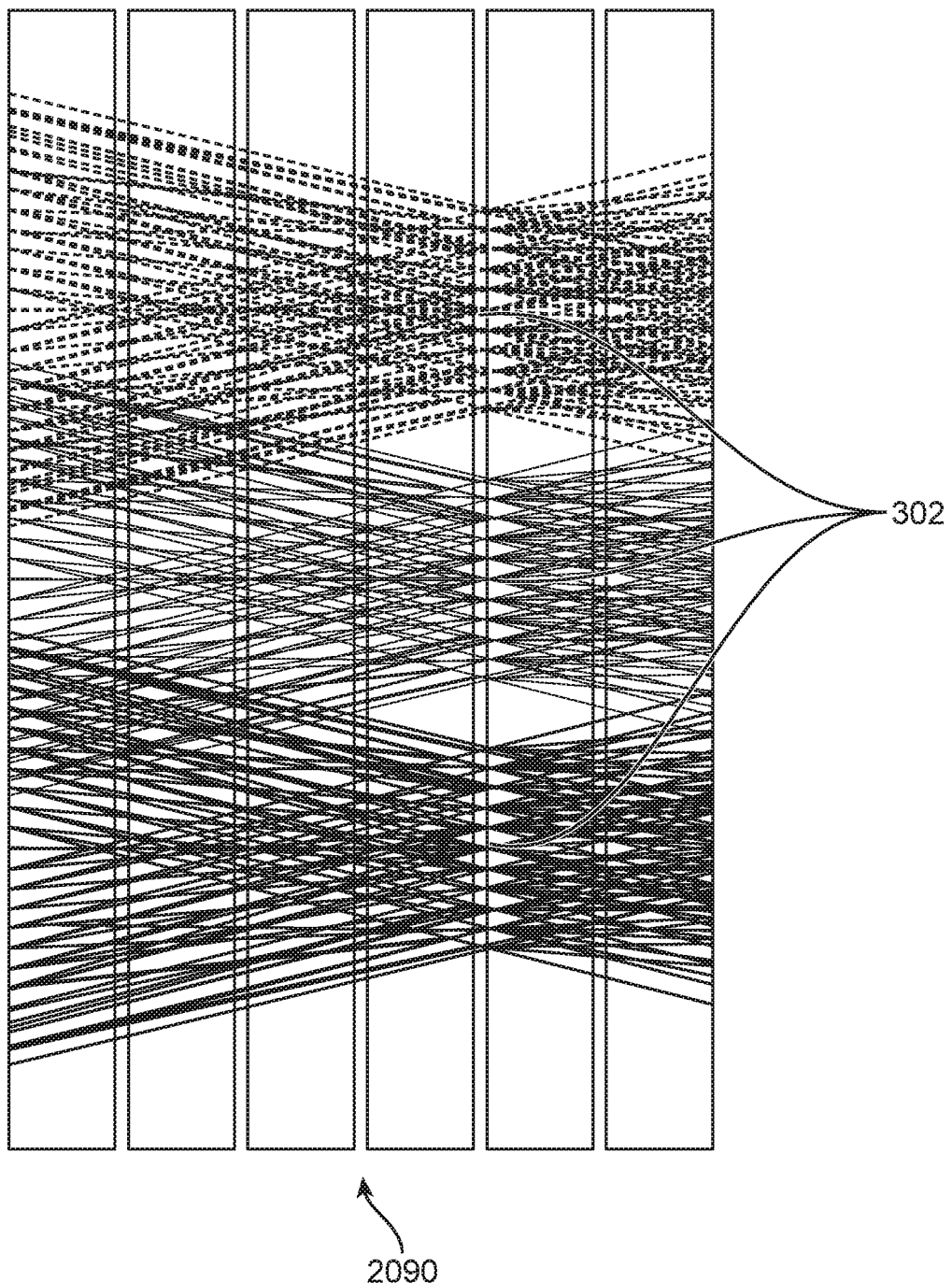
FIG. 29 is a detailed schematic view of separated sub-pupils formed by the augmented reality system depicted in FIG. 28.

FIG. 28 is another depiction of the AR system 2000 depicted in FIG. 27. The optical elements in the two systems are the same, however, the optical elements in the system 2000 depicted in FIG. 28 is shown with ray sets that generate three sub-pupils 302 disposed at the back of the second LOE 2090 in the six LOE 2090 stack. FIG. 28 shows the ray sets for the full super pupil. FIG. 29 shows the three sub-pupils 302 from FIG. 28 in detail.

Figure 30:
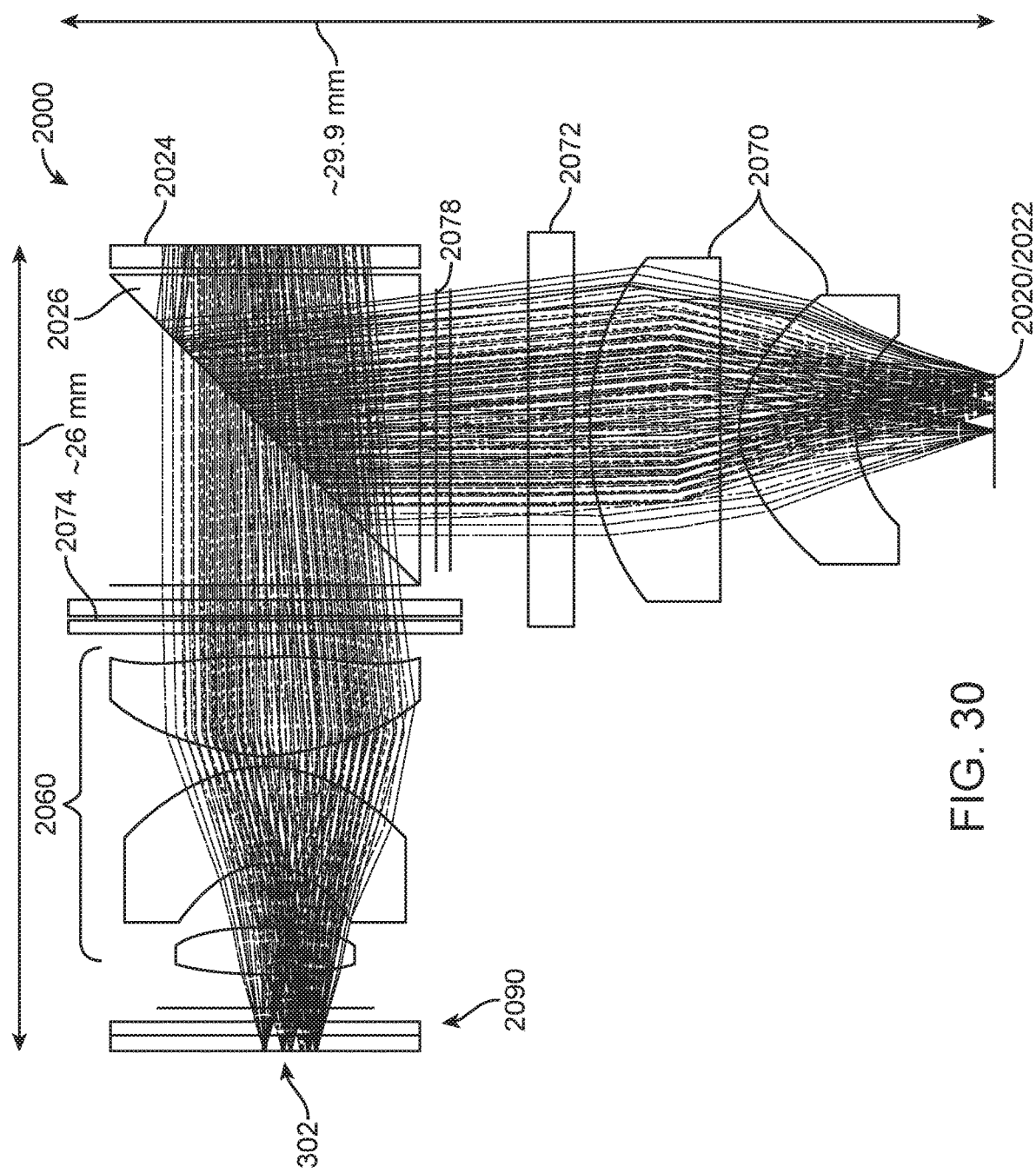

FIG. 30 depicts another embodiment of an AR system 2000 very similar to the one depicted in FIG. 10. The system 2000 includes a light source 2020 including a plurality of sub-light sources 2022 (e.g., LEDs and/or fibers attached to sub-light sources), two lenses forming a condenser 2070, a linear polarizer 2072, a triple band-pass filter 2078, a beam-splitter 2026, an SLM 2024 (e.g., LCOS), a half-wave plate 2074, an injection optical system 2060, and two LOEs 2090. The system is configured to generate sub-pupils 302 at the back of the second LOE 2090 that correspond to a 1:1 image of the sub-light sources 2022. In the embodiment depicted in FIG. 30, the optical path forms an approximate right angle with a first length of about 29.9 mm between the light source 2020 and the beam-splitter 2026 and a second length of about 26 mm between the beam-splitter 2026 and the second LOE 2090.

Figure 31:
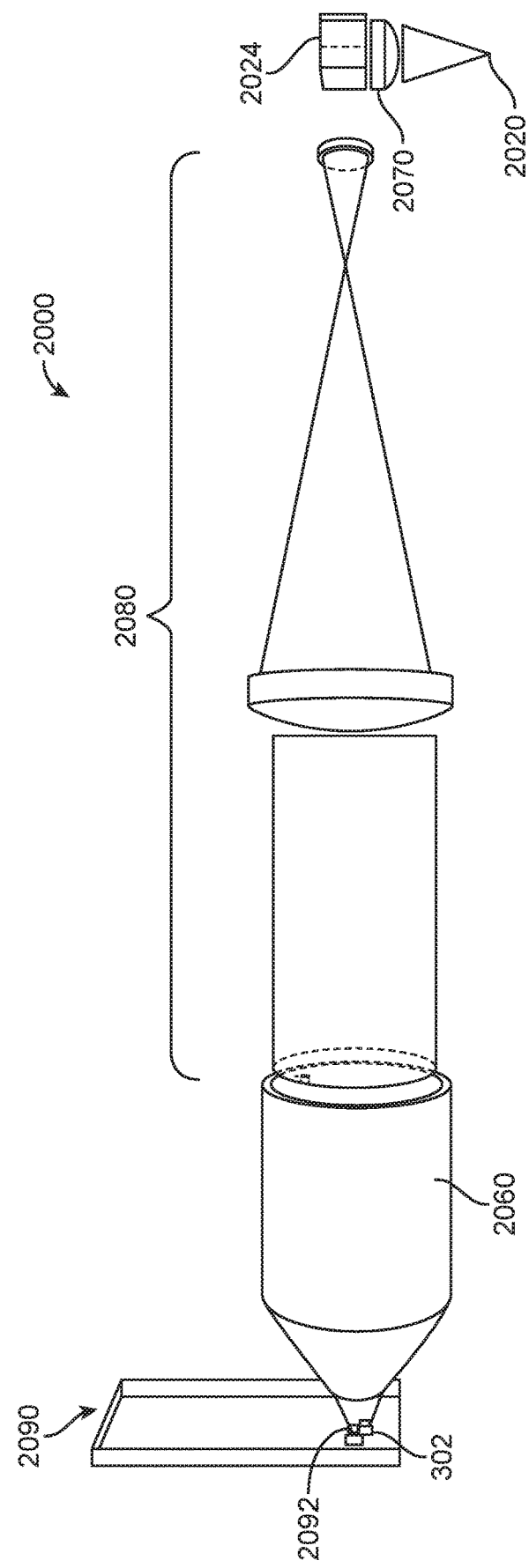
FIGS. 31 and 32 are exploded views of simple augmented reality systems according to two embodiments.

FIG. 31 is a schematic view of simple a simple AR system 2000 configured to generate a sub-pupil 302 corresponding to a light source 2020. The system 2000 includes an LED light source 2020, a condenser 2070, an SLM 2024, a relay optical system 2080, an injection optical system 2060, and an LOE 2090. The condenser 2070 may have a focal length of 40 mm. The SLM 2024 may be an LCOS. The relay optical system 2080 may include two lenses: a first lens with a focal length of 100 mm; and a second lens with a focal length of 200 mm. The injection optical system may be a compound lens with an effective focal length of 34.3 mm. Using this system 2000, a 3.5 mm separation between LED light sources 2020 generates an approximate 2.25 mm separation between sub-pupils 302 at the LOE 2090.

Figure 32:
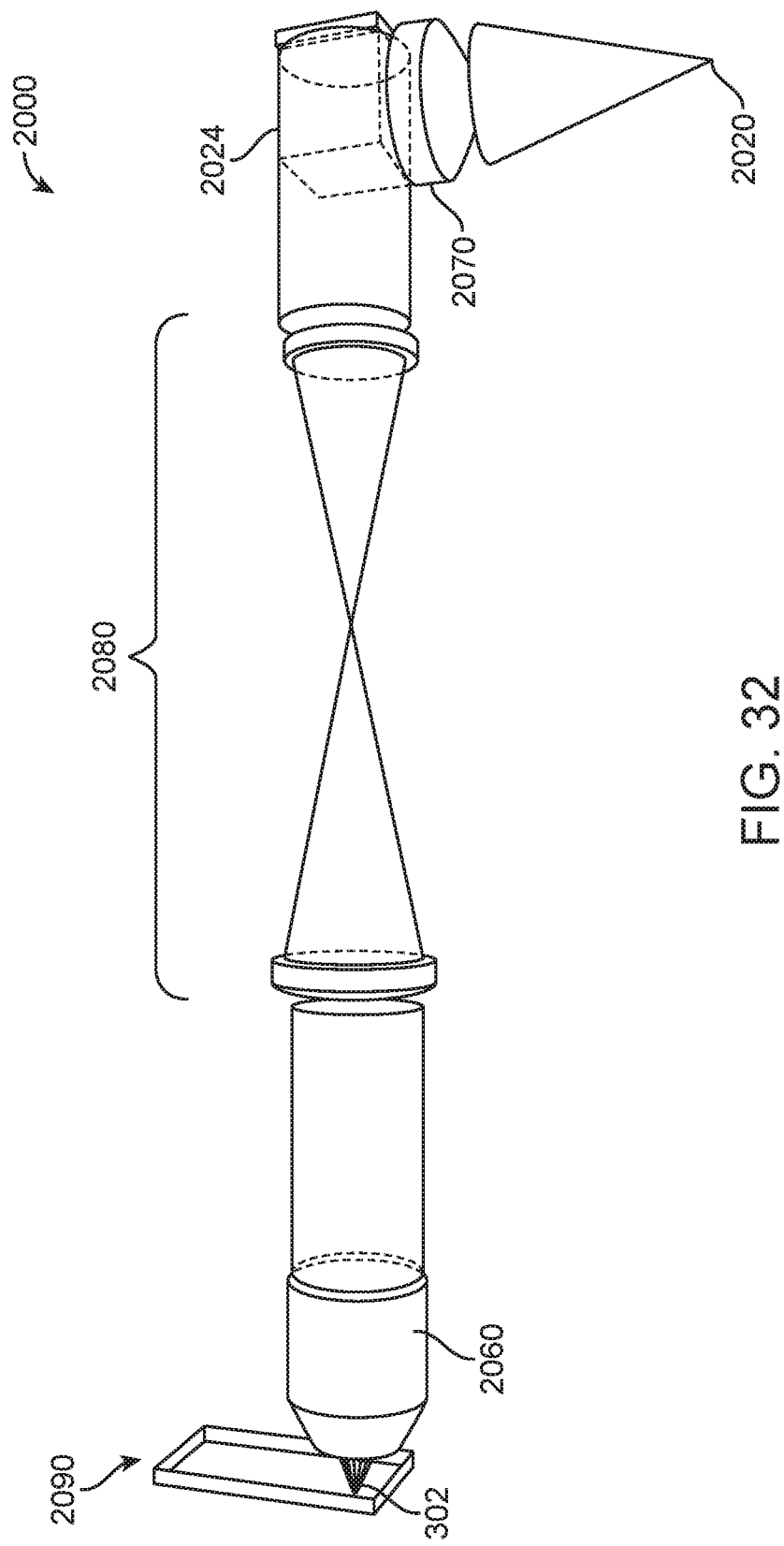

FIG. 32 is a schematic view of another simple AR system 2000 very similar to the one depicted in FIG. 31. The optical elements in the two systems 2000 are very similar. The differences are: (1) the second lens (forming part of the relay optical system 2080) has a focal length of 120 mm; and (2) the injection optical system has an effective focal length of 26 mm. Using this system 2000, a 3.5 mm separation between LED light sources 2020 generates an approximate 3.2 mm separation between sub-pupils 302 at the LOE 2090.

In another embodiment, an AR system may be configured to provide multiplanar focusing simultaneously. For example, with three simultaneous focal planes, a primary focus plane (based upon measured eye accommodation, for example) could be illuminated by activating corresponding sub-light source, and a + margin and − margin (i.e., one focal plane closer, one farther out) could also be illuminated by activating respective sub-light sources to provide a large focal range in which the user can accommodate before the planes need to be updated. This increased focal range can provide a temporal advantage if the user switches to a closer or farther focus (i.e., as determined by accommodation measurement). Then the new plane of focus could be made to be the middle depth of focus plane, with the + and − margins again ready for a fast switchover to either one while the system catches up.

In embodiments where each of the LOEs 2090 receives and propagates injected light from a separate corresponding sub-light source 2022, each sub-light source 1022 can operate at a reasonable speed, while the system 2000 maintains a sufficiently high refresh rate to rapidly generate different images/portions of the images to be injected into multiple LOEs 2090. For example, a first LOE 2090 may be first injected with light from a first sub-light source 1022 that carries the image of the sky encoded by the SLM 1040 at a first time. Next, a second LOE 2090 may be injected with light from a second sub-light source 1022 that carries the image of a tree branch encoded by the SLM 1040 at a second time. Then, a third LOE 2090 may be injected with light from a third sub-light source 1022 that carries the image of a pen encoded by that SLM 1040 at a third time. This process can be repeated to provide a series images at various depth planes. Thus, by having multiple sub-light sources 2022 instead of a single light source 2020 rapidly generating all the images to be fed into multiple LOEs 2090, each sub-light source 2022 can operate at a reasonable speed to inject images only to its respective LOE 2090.

In another embodiment of an AR system 1000 including an eye-tracking subsystem 1050, two sub-light sources 1022 corresponding to two LOEs 1090 having depth planes that are situated close together may be simultaneously activated to build in an allowance of error in the eye-tracking subsystem and account for other system deficiencies by projecting the virtual content not just on one depth, but at two depth planes that are in close proximity to each other and the detected user eye focus/accommodation.

In still another embodiment of an AR system 1000, to increase the field of view of optics, a tiling approach may be employed including two (or more) sets of stacked LOEs 1090, each having a corresponding plurality of sub-light sources 1022. Thus, one set of stacked LOEs 1090 and corresponding sub-light sources 1022 may be configured to deliver virtual content to the center of the user's eye, while another set of stacked LOEs 1090 and corresponding sub-light sources 1022 may be configured to deliver virtual content to the periphery of the user's eyes. Similar to the embodiment depicted in FIG. 5 and described above, each stack may comprise six LOEs 1090 for six depth planes. Using both stacks together, the user's field of view is significantly increased. Further, having two different stacks of LOEs 1090 and two pluralities of corresponding sub-light sources 1022 provides more flexibility such that slightly different virtual content may be projected in the periphery of the user's eyes compared to virtual content projected to the center of the user's eyes. More details on the tiling approach are described in above-referenced U.S. Prov. Patent Application Ser. No. 62/005,865, the contents of which have been previously incorporated by reference.

Pupil Expanders

It should be appreciated that the stacked DOEs/light-guiding optical elements 1090, 2090 discussed above can additionally function as an exit pupil expander ("EPE") to increase the numerical aperture of a light source 1020, 2020, thereby increasing the resolution of the system 1000, 2000. The light source 1020, 2020 produces light of a small diameter/spot size, and the EPE can expand the apparent pupil of light exiting from the light-guiding optical element 1090, 2090 to increase the system resolution. In other embodiments of the AR system, the system may further comprise an orthogonal pupil expander ("OPE") in addition to an EPE to expand the light in both the X and Y directions. More details about the EPEs and OPEs are described in the above-referenced U.S. Prov. Patent Application Ser. No. 61/909,174 and U.S. Prov. Patent Application Ser. No. 62/005,807, the contents of which are hereby expressly and fully incorporated by reference in their entirety, as though set forth in full.

Other types of pupil expanders may be configured to function similarly in systems that employ light sources 1020, 2020. Although light sources 1020, 2020 offer high resolution, brightness and are compact, they have a small numerical aperture (i.e., small spot size). Thus, AR systems 1000, 2000 typically employ some type of pupil expander that essentially works to increase the numerical aperture of the generated light beams. While some systems may use DOEs that function as EPEs and/or OPEs to expand the narrow beam of light generated by light sources 1020, 2020, other embodiments may use diffusers to expand the narrow beam of light. The diffuser may be created by etching an optical element to create small facets that scatter light. In another variation, an engineered diffuser, similar to a diffractive element, may be created to maintain a clean spot size with desirable numerical aperture, which is similar to using a diffractive lens. In other variations, the system may include a PDLC diffuser configured to increase the numerical aperture of the light generated by the light source 1020, 2020.

Figure 33:
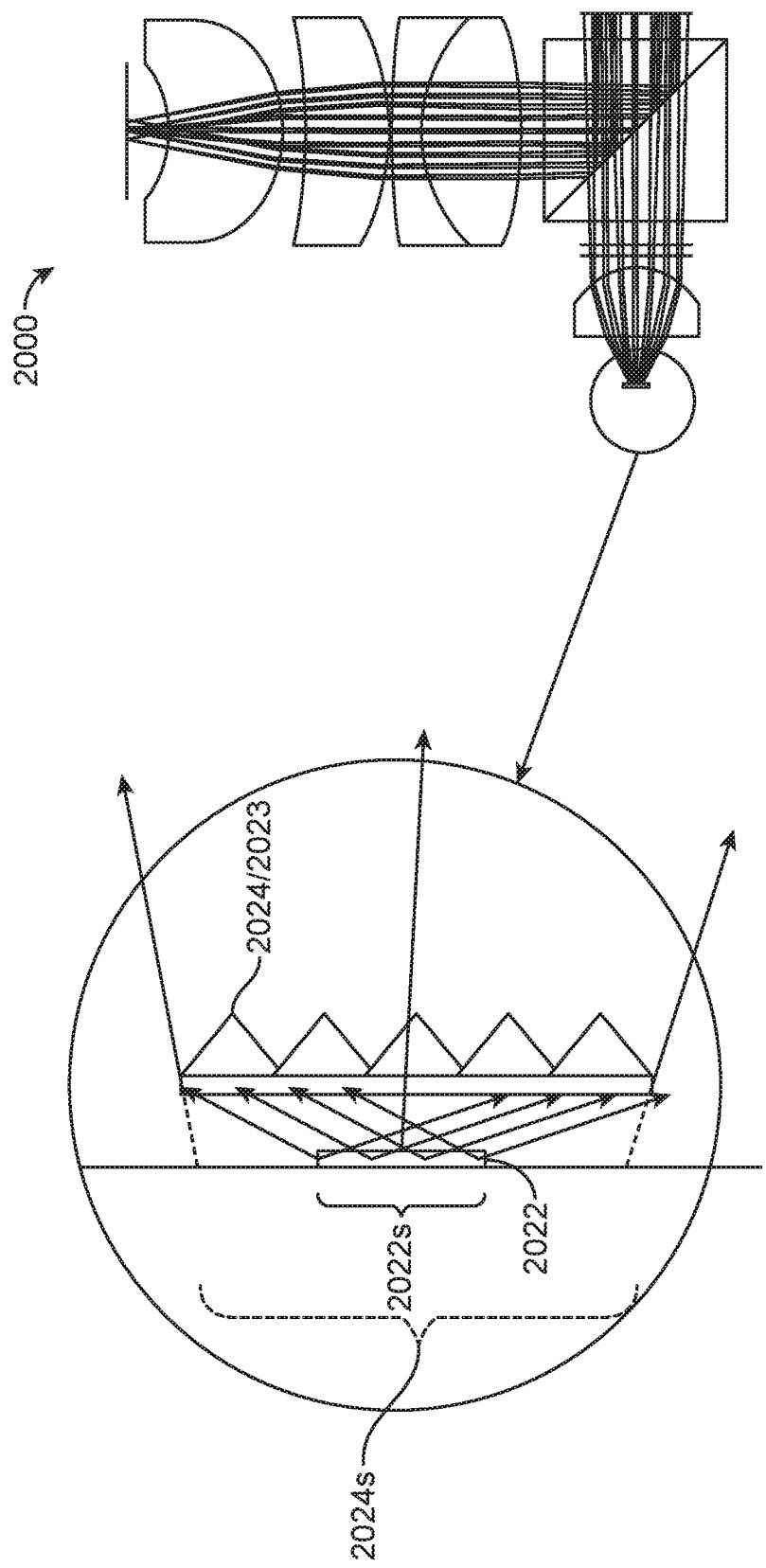
FIG. 33 is a schematic view of a light source and a pupil expander of an augmented reality system according to still another embodiment.

FIG. 33 depicts a sub-light source 2022 (e.g., an LED) and a pupil expander 2024, both of which are configured for use in an AR system 2000 to generate a sub-pupil 302 corresponding to the sub-light source 2022. The pupil expander 2024 is a film 2023 having a prism pattern disposed thereon. The prism pattern modifies the beam emanating from the sub-light source 2022 to change the apparent size of the sub-light source 2022 from the actual source size 2022s to a larger virtual source size 2024s. The virtual source size 2024s can also be modified by changing the distance between the sub-light source 2022 and the pupil expander 2024.

Reducing SLM Artifacts

Figure 34A:
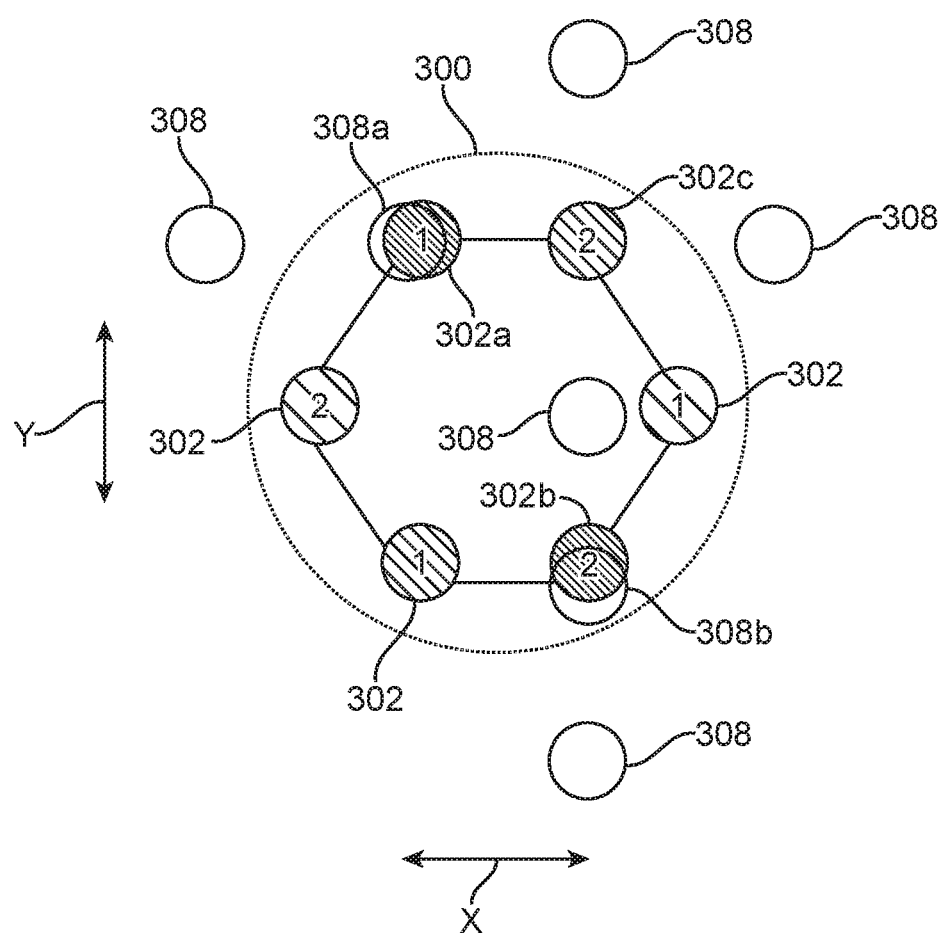
FIGS. 34A and 35A depict sub-pupil and super-pupil configurations generated by augmented reality systems according to two embodiments.

FIG. 34A shows a spatial arrangement of sub-pupils 302 within a super-pupil 300 similar to the ones depicted in FIGS. 14B and 15A. As shown in FIG. 34A, AR systems 2000 can be configured such that the respective sub-pupils 302 are spatially separated in the X, Y plane. FIG. 34A also depicts artifacts 308 formed by diffraction of the light beam corresponding to the sub-pupil 302c at approximately one o'clock in the circular super-pupil 300. The light beam is diffracted by the SLM (e.g., DLP or LCOS) pixel boundaries and structures, and forms a series of artifacts 308 that are aligned with sub-pupil 302c along the X and Y axes.

Figure 34B:
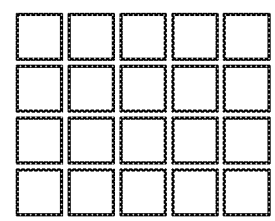
FIGS. 34B and 35B depict display pixels generated by augmented reality systems according to two embodiments.
Figure 34B:
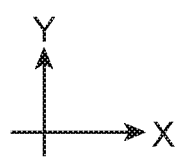

The artifacts 308 are aligned along the X and Y axes because of the structure of the SLM, which corresponds to the structure of the display pixels (shown in FIG. 34B). Returning to FIG. 34A, it is apparent that two artifacts 308a, 308b at least partially overlap respective sub-pupils 302a, 302b. Accordingly, in the system 2000 corresponding to the sub-pupil 302 pattern depicted in FIG. 34A, light for the beam corresponding to sub-pupil 302c will enter sub-pupils 302a and 302b. The artifacts 308a, 308b will generate undesirable artifacts (i.e., stray light) in the images intended to be displayed through pupils 308a and 308b. While FIG. 34A depicts only artifacts 308 corresponding to sub-pupil 302c, each of the other sub-pupils 302 will have their own set of artifacts (not shown for clarity). Accordingly, cross-talk will increase proportional to the number of sub-pupils 302 in the system 2000.

Figure 35A:
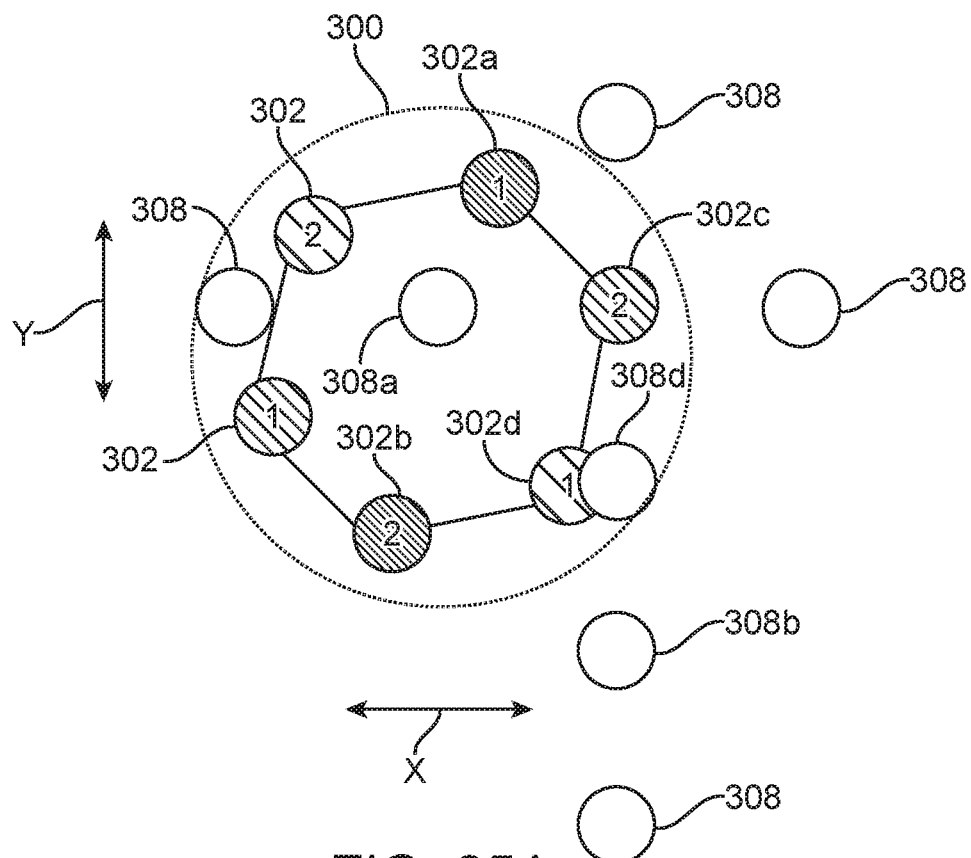
Figure 35B:
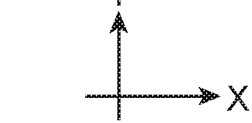

FIG. 35A depicts a spatial arrangement of sub-pupils 302 within a super-pupil 300 similar to the one shown in FIG. 34A. However, the sub-light sources 2022 and the in-coupling gratings of the AR system 2000 have been rotated (e.g., approximately 30 degrees) clockwise around the optical axis relative to the SLM in order to reduce the SLM generated diffractive cross-talk between beams. The artifacts 308 remain aligned along the X and Y axes because of the structure of the SLM, which corresponds to the structure of the display pixels (shown in FIG. 35B). As shown in FIG. 35A, rotating the sub-light sources 2022 relative to the SLM and display pixel grid reduces overlap between diffracted energy and in-coupling gratings, thereby reducing stray light, contrast issues and color artifacts. In particular, artifacts 308a and 308b no longer overlap sub-pupils 302a and 302b. However, artifact 308d now partially overlaps sub-pupil 302d, although to a lesser extent than the overlaps depicted in FIG. 34A. Accordingly, in this embodiment, the system 2000 is configured such that the positions of the sub-light sources 2022 and in-coupling gratings are rotated (e.g., about 30 degrees) around the optical axis relative to the SLM in order to reduce the (SLM generated) diffractive cross-talk between beams.

The above-described AR systems are provided as examples of various optical systems that can benefit from more space efficient optics. Accordingly, use of the optical systems described herein is not limited to the disclosed AR systems, but rather applicable to any optical system.

Various exemplary embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A method of operating an imaging system, the method comprising:
   producing, by a light source, a plurality of spatially separated light beams, wherein the light source comprises a first group of sub-light sources and a second group of sub-light sources;
   thereafter, encoding each of the plurality of spatially separated light beams with image data using a spatial light modulator to provide a plurality of spatially separated encoded light beams, wherein the first group of sub-light sources is disposed at a first distance from the spatial light modulator and the second group of sub-light sources are disposed at a second distance from the spatial light modulator, the first distance and the second distance being different;
   receiving the plurality of spatially separated encoded light beams at an injection optical system comprising one or more refractive lenses, wherein each of the one or more refractive lenses of the injection optical system is disposed along an optical axis passing through each of the one or more refractive lenses;
   modifying the plurality of spatially separated encoded light beams using the one or more refractive lenses of the injection optical system to produce spatially separated pupils associated with respective encoded light beams of the plurality of spatially separated encoded light beams, wherein the one or more refractive lenses of the injection optical system focus each of the spatially separated pupils at different respective focal points, wherein the spatially separated pupils define a super-pupil comprising six spatially separated sub-pupils rotated around the optical axis such that there are 60 degrees of angular displacement between each of the six spatially separated sub-pupils with respect to the optical axis;
   admitting each of the plurality of spatially separated encoded light beams at an in-coupling grating of a respective light-guiding optical element of a plurality of light-guiding optical elements while excluding others of the plurality of spatially separated encoded light beams from the respective light-guiding optical element of the plurality of light-guiding optical elements, wherein for each light-guiding optical element of the plurality of light-guiding optical elements, the in-coupling grating of each light-guiding optical element is rotated by an angle with respect to the optical axis; and
   propagating each of the plurality of spatially separated encoded light beams by total internal reflection through the respective light-guiding optical element of the plurality of light-guiding optical elements.

2. The method of claim 1, wherein each beam of the plurality of spatially separated light beams differs from other beams of the plurality of spatially separated light beams in at least one light property.

3. The method of claim 2, wherein the at least one light property comprises color.

4. The method of claim 1, wherein the light source further comprises a second plurality of spatially separated light beams and the spatial light modulator is configured to encode each of the second plurality of spatially separated light beams with second image data.

5. The method of claim 1, further comprising modifying a shape of one or more of the spatially separated pupils using a mask.

6. The method of claim 5, wherein the mask is adjacent to the plurality of light-guiding optical elements.

7. The method of claim 1, further comprising modifying a size of one or more of the spatially separated pupils using an optical element, wherein the optical element is adjacent to the plurality of light-guiding optical elements.

8. The method of claim 1, wherein the injection optical system is characterized by an eccentric cross-section along an optical path of the imaging system.

9. The method of claim 1, wherein admitting each of the plurality of spatially separated encoded light beams at the in-coupling grating of the respective light-guiding optical element of a plurality of light-guiding optical elements comprises encountering the in-coupling grating only once.

10. The method of claim 1, further comprising increasing a numerical aperture of the light source using a pupil expander.

11. The method of claim 10, wherein the pupil expander comprises a film having a prism pattern disposed thereon.

12. The method of claim 1, wherein each of the spatially separated pupils associated with respective encoded light beams of the plurality of spatially separated encoded light beams are characterized by one of a plurality of sizes.

13. The method of claim 1, wherein:
   a first pupil of the spatially separated pupils is characterized by a first size;
   a second pupil of the spatially separated pupils is characterized by a second size; and
   the first size and the second size are different.

14. The method of claim 13, wherein:
   the first pupil is formed at a first Z distance from the injection optical system;
   the second pupil is formed at a second Z distance from the injection optical system;

the second Z distance is greater than the first Z distance; and the first size is greater than the second size.

15. The method of claim 1, wherein the respective focal points are spatially separated from each other in the X, Y, and Z directions with respect to the optical axis.

* * * * *